(12) United States Patent
Hara

(10) Patent No.: US 7,640,741 B2
(45) Date of Patent: Jan. 5, 2010

(54) DRIVING APPARATUS

(75) Inventor: Yoshihiro Hara, Takatsuki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 378 days.

(21) Appl. No.: 11/598,358

(22) Filed: Nov. 13, 2006

(65) Prior Publication Data

US 2007/0109412 A1    May 17, 2007

(30) Foreign Application Priority Data

Nov. 16, 2005    (JP) ............................ 2005-331598

(51) Int. Cl.
*F01B 29/10* (2006.01)
(52) U.S. Cl. ........................... 60/527; 60/528; 310/306; 310/307
(58) Field of Classification Search ........... 60/527–529; 310/306–307
See application file for complete search history.

(56) References Cited

U.S. PATENT DOCUMENTS

| | | | | |
|---|---|---|---|---|
| 4,932,210 A | * | 6/1990 | Julien et al. | ................... 60/527 |
| 6,137,103 A | * | 10/2000 | Giles et al. | ................... 250/216 |
| 6,945,045 B2 | * | 9/2005 | Hara et al. | ..................... 60/527 |
| 2004/0015178 A1 | * | 1/2004 | Monassevitch et al. | ...... 606/153 |

FOREIGN PATENT DOCUMENTS

JP    2003-125590 A    4/2003

* cited by examiner

*Primary Examiner*—Hoang M Nguyen
(74) *Attorney, Agent, or Firm*—Sidley Austin LLP

(57) ABSTRACT

In an auto image stabilization system, a driving member formed as a wire of shape memory alloy (SMA) is retained by a projection of an image capturing unit. A distance Lb from the rotation center of an elastic deforming part to center of gravity (point of application) of the image capturing unit is longer than a distance La from the rotation center of the elastic deforming part to the projection (power point). In the configuration, equivalent mass (apparent mass) of the image capturing unit becomes (Lb/La) times, and it causes deterioration in response. Consequently, the driving member having an ellipse-shaped section in which a value obtained by dividing the width in the longer direction of the section by the width in the shorter direction is 1.3 or larger is employed. As a result, heat dissipation of the driving member increases, so that response in the SMA actuator can be properly improved.

20 Claims, 18 Drawing Sheets

F I G. 7 A
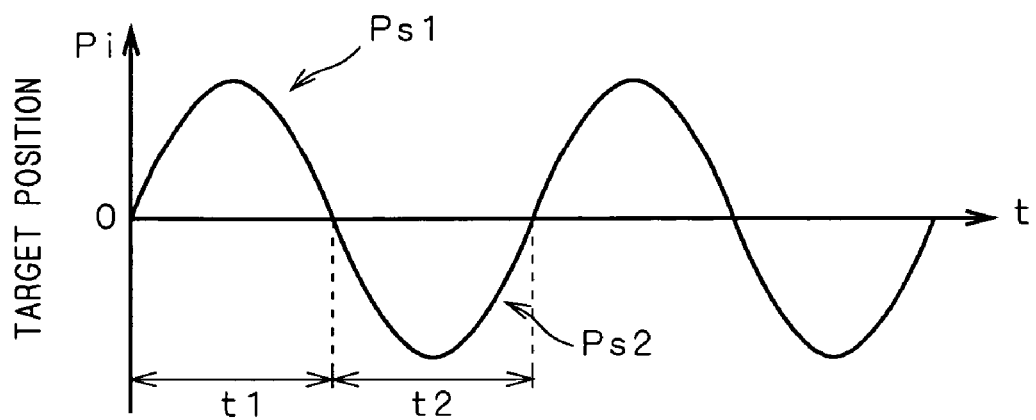
F I G. 7 B
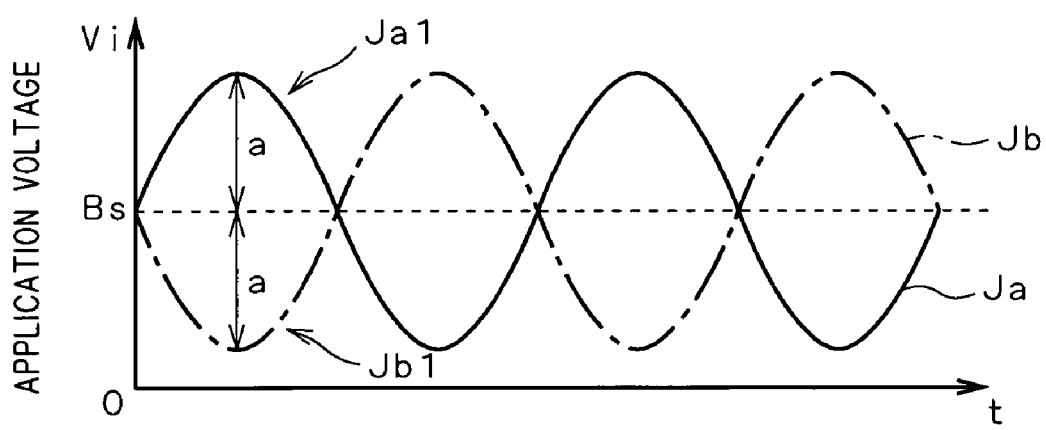

F I G. 1 0 A
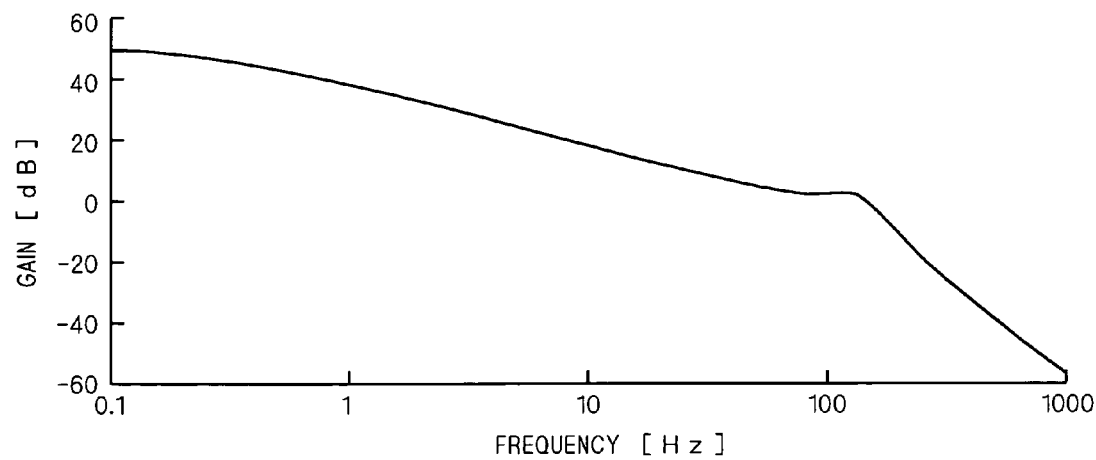
F I G. 1 0 B
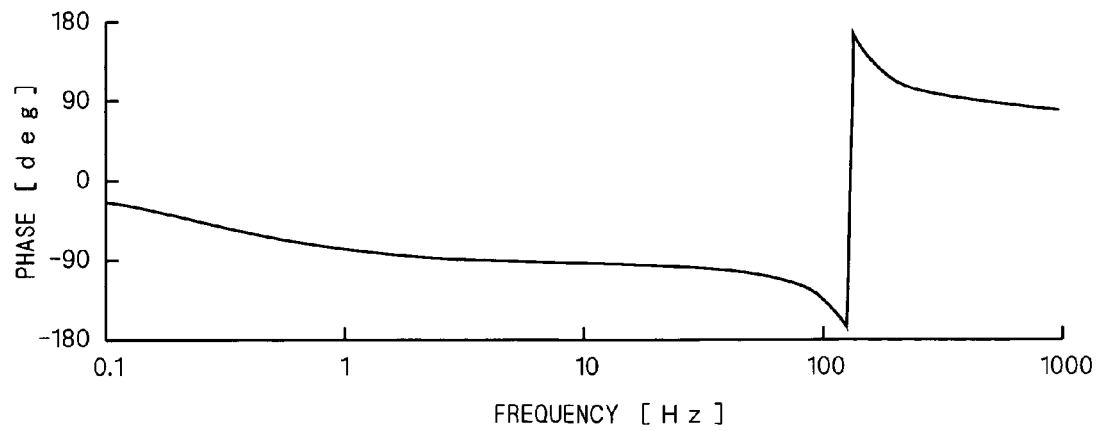

F I G. 1 3 A
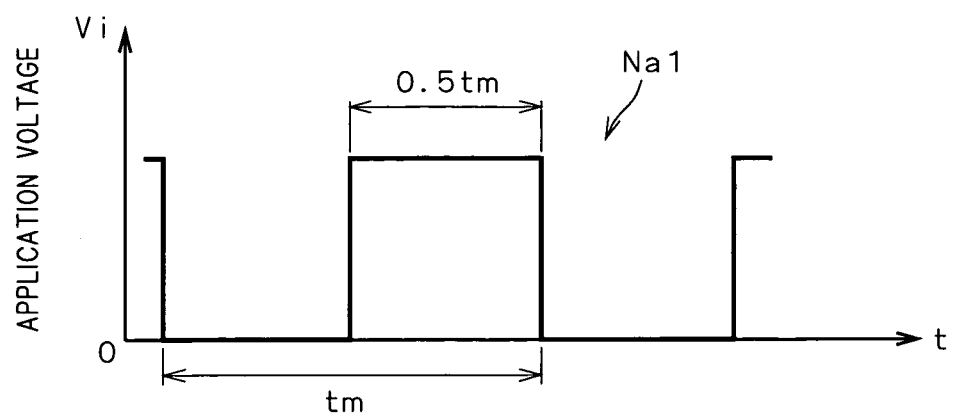
F I G. 1 3 B
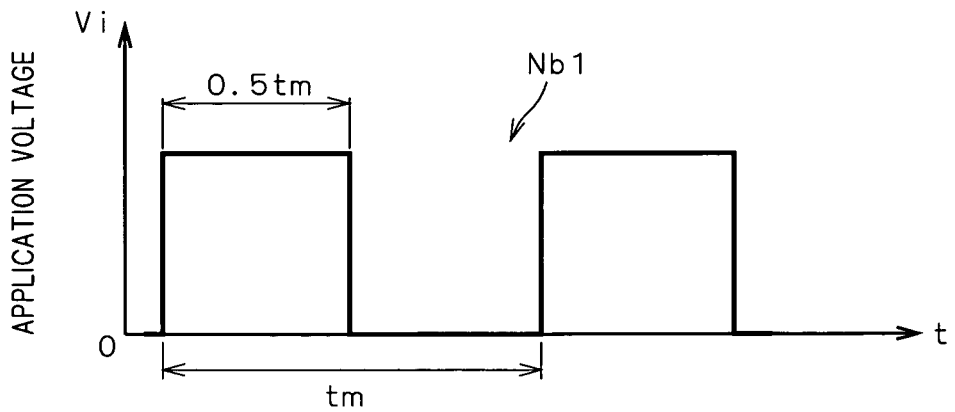

F I G. 1 4 A
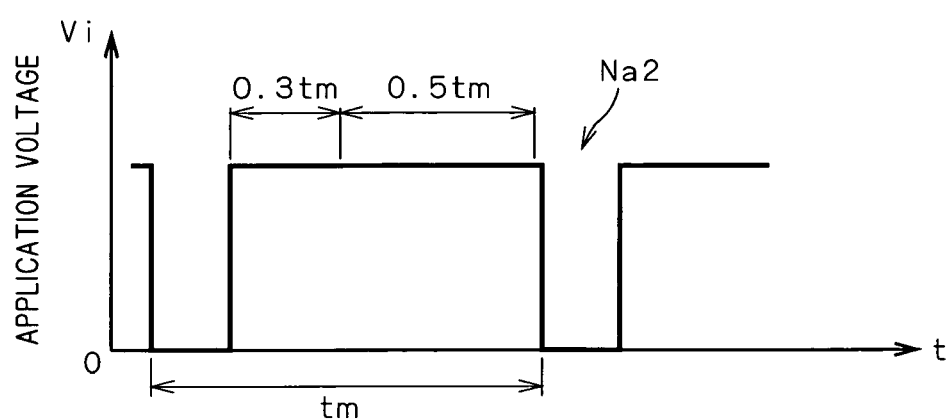
F I G. 1 4 B
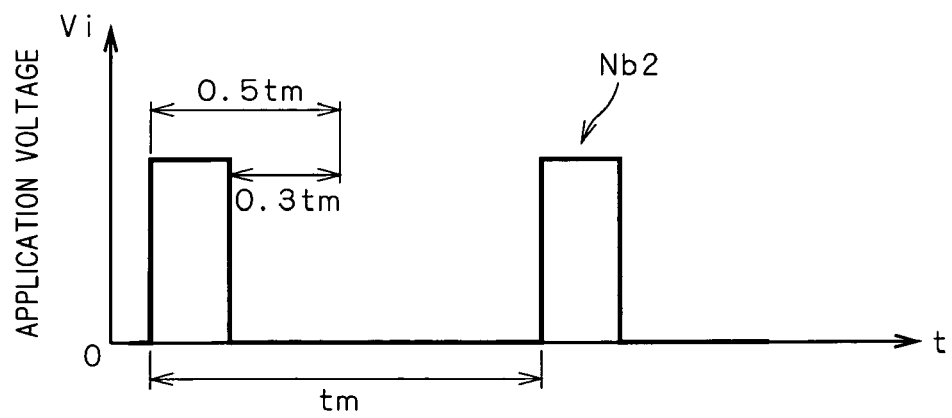

F I G . 1 7 A
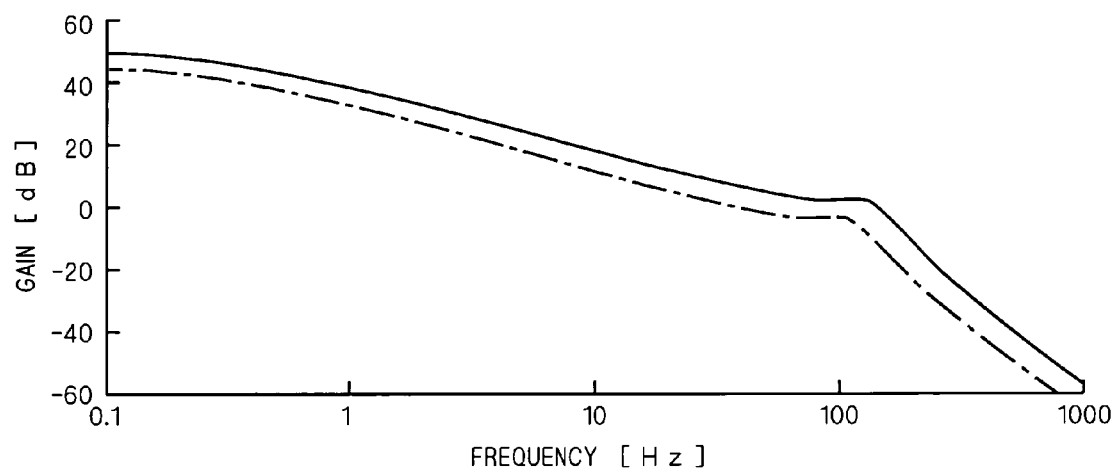
F I G . 1 7 B
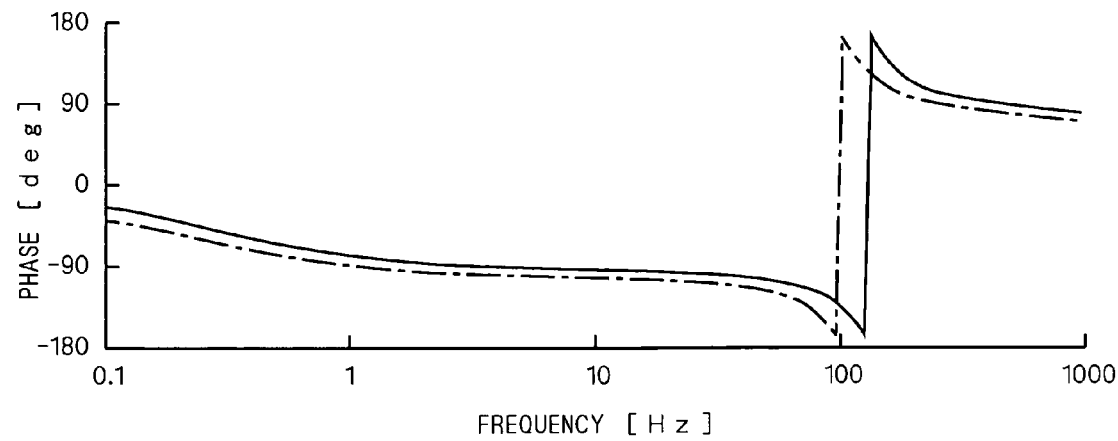

F I G. 1 8 A
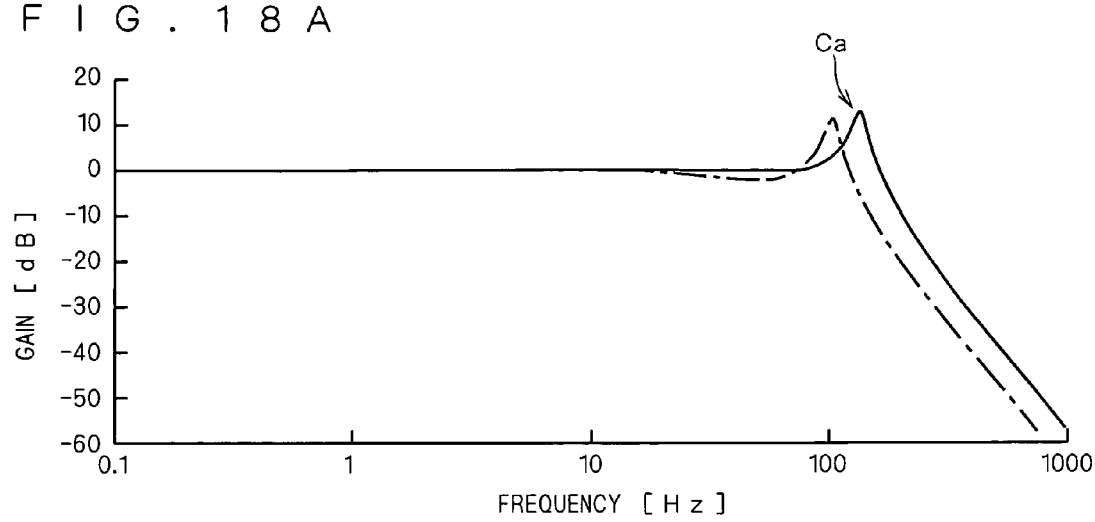
F I G. 1 8 B
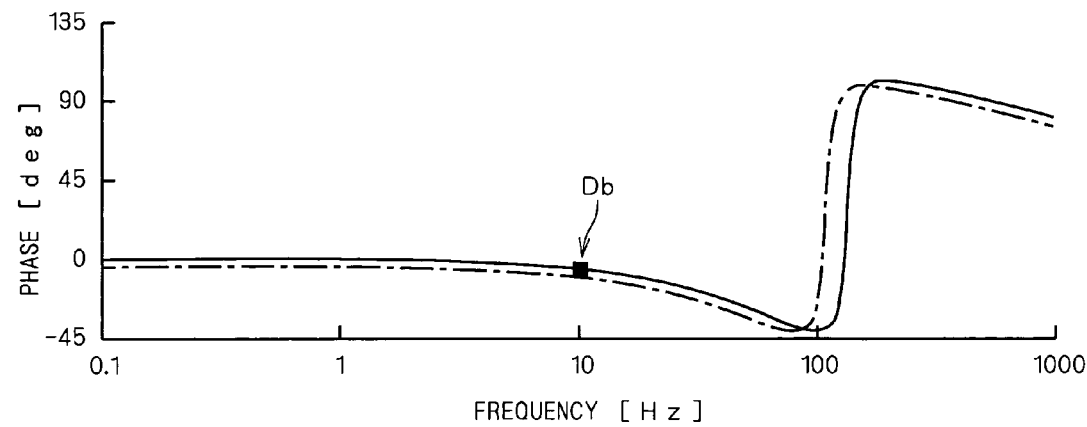

FIG. 19

| CASE | 1 | 2 | 3 | 4 |
|---|---|---|---|---|
| ELLIPTICITY | 1 : 1 | 1 : 1.2 | 1 : 1.35 | 1 : 1.5 |
| SECTIONAL SHAPE | ○ | ○ | ○ | ○ |
| COOLING TIME | 100% | ABOUT 90% | ABOUT 80% | ABOUT 70% |

DRIVING APPARATUS

This application is based on application No. 2005-331598 filed in Japan, the contents of which are hereby incorporated by reference.

BACKGROUND OF THE INVENTION

1. Field of the Invention

The present invention relates to a driving apparatus for driving a movable part by using an actuator connected to the movable part.

2. Description of the Background Art

A shape memory alloy (hereinbelow, also called "SMA") has a property such that even if it is plastic-deformed by an external force at a temperature equal to or less than martensite transformation start temperature, when heated to a temperature equal to or higher than reverse transformation end temperature, the SMA regains its memorized original shape. A driving apparatus using, as an actuator, an SMA having such a property is known.

In the case of making auto image stabilization by an actuator using the SMA (hereinbelow, also called "SMA actuator"), the driving performance of cancelling out a hand shake of about at least 10 Hz is demanded.

A technique for improving the driving performance of an SMA actuator having low response is proposed in, for example, Japanese Patent Laid-open No. 2003-125590. According to the technique, by improving a phase lag by performing two or more derivative control actions in a servo control system, the response of the SMA actuator is increased.

However, in the technique of Japanese Patent Laid-open No. 2003-125590, two or more derivative control actions are performed. Consequently, noise included in a measurement signal of position or the like is also amplified, and a special filter or the like is necessary as a countermeasure. Since tuning of the derivative control is difficult, there is also a problem such that a correction according to a change in environment temperature and the like is necessary. In the case of improving the response of the SMA actuator only by improving the control system (software), various problems occur as side effects. As a result, the response cannot be properly improved.

SUMMARY OF THE INVENTION

The present invention is directed to a driving apparatus. According to the present invention, the driving apparatus includes: (a) a movable part; and (b) an actuator connected to the movable part and driving the movable part, the actuator having a first elastic part and a second elastic part which are connected to the movable part in a push-pull relation. At least one of the first elastic part and the second elastic part is formed as a wire made of a shape memory alloy, and a sectional shape of the wire is flattened in shape. With the configuration, heat dissipation of shape memory alloy (SMA) increases, so that the response of the SMA actuator can be properly improved.

In a preferred embodiment of the invention, the driving apparatus further includes: (c) a sensor for obtaining a measurement value with regard to a driving of the movable part; and (d) a controller for passing current to the wire on basis of a deviation between a drive target value of the movable part and the measurement value in order to control a driving of the movable part. With the configuration, servo driving on the movable part can be performed properly.

Therefore, an object of the present invention is to provide a driving apparatus realizing proper improvement in response of the SMA actuator.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are diagrams for illustrating operation of the auto image stabilization system.

FIGS. 10A and 10B are diagrams illustrating a result of simulation performed on an SMA actuator having a wire diameter of $\phi 40$ μm.

FIGS. 13A and 13B are diagrams illustrating operation of PWM control in the auto image stabilization system.

FIGS. 14A and 14B are diagrams illustrating operation of the PWM control in the auto image stabilization system.

FIGS. 17A and 17B are diagrams showing degradation in the frequency characteristic due to increase in equivalent mass.

FIGS. 18A and 18B are diagrams showing degradation in the frequency characteristic due to increase in equivalent mass.

FIG. 19 is a diagram showing the relation between flatness of a driving member and cooling time.

DESCRIPTION OF PREFERRED EMBODIMENTS OF THE INVENTION

Configuration of Main Part of Cellular Phone

Figure 1:
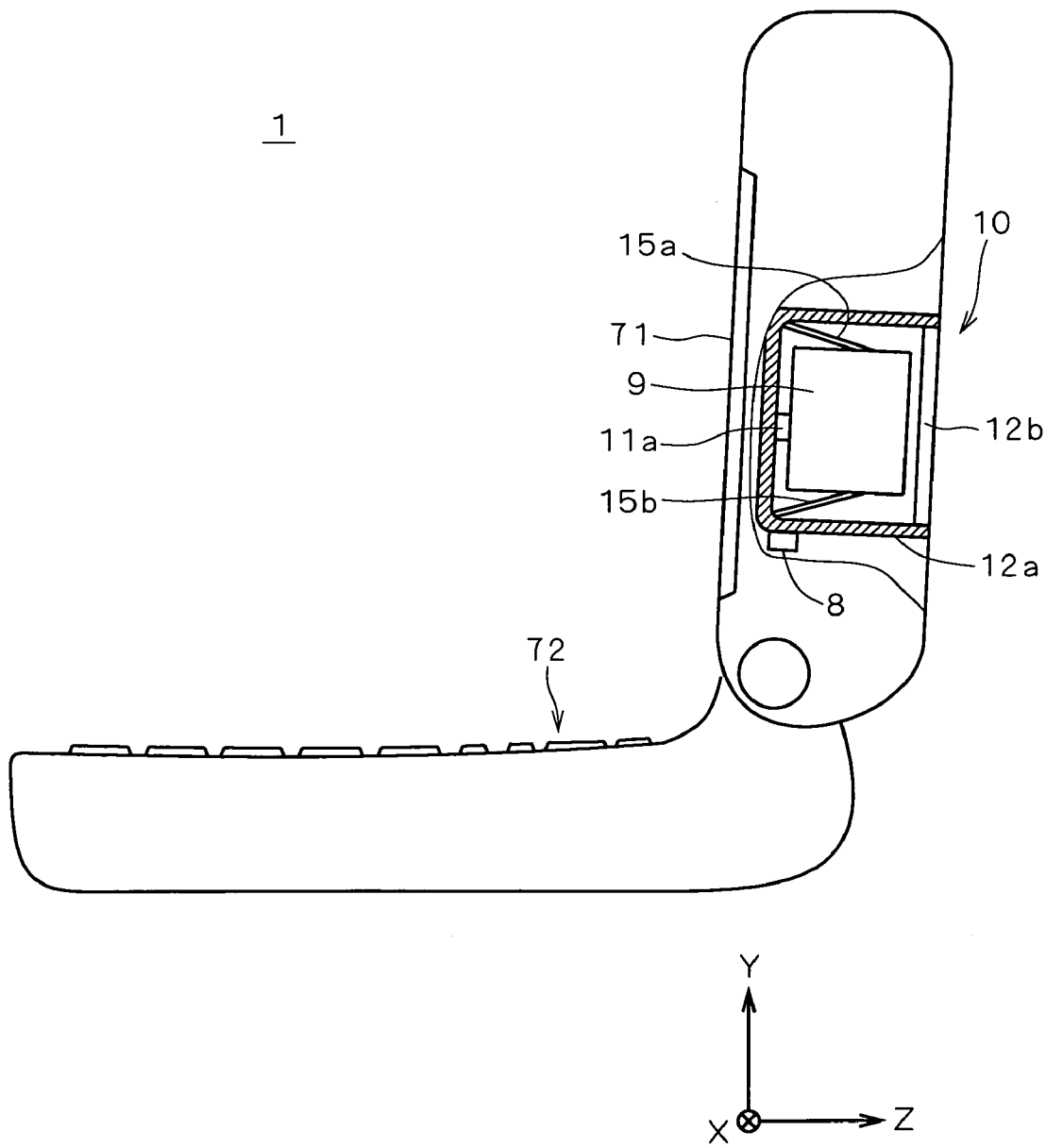
FIG. 1 is a side view showing a cellular phone in which an auto image stabilization system is assembled.

FIG. 1 is a side view of a cellular phone 1 in which an auto image stabilization system 10 is assembled. The cellular phone 1 has a communication function and also an image capturing function, and functions not only as a communication device but also as an image capturing device.

As shown in FIG. 1, the cellular phone 1 has the auto image stabilization system 10 having a configuration simpler than that of an auto image stabilization system 10A which will be described later and also has, on the surface of the body, a display 71 such as an LCD (Liquid Crystal Display) and an input part 72 constructed by various keys. In a broken-out part in FIG. 1, the internal state of the cellular phone 1 is shown. As shown in the broken-out part, the cellular phone 1 has therein the auto image stabilization system 10 functioning as a driving apparatus.

Figure 2:
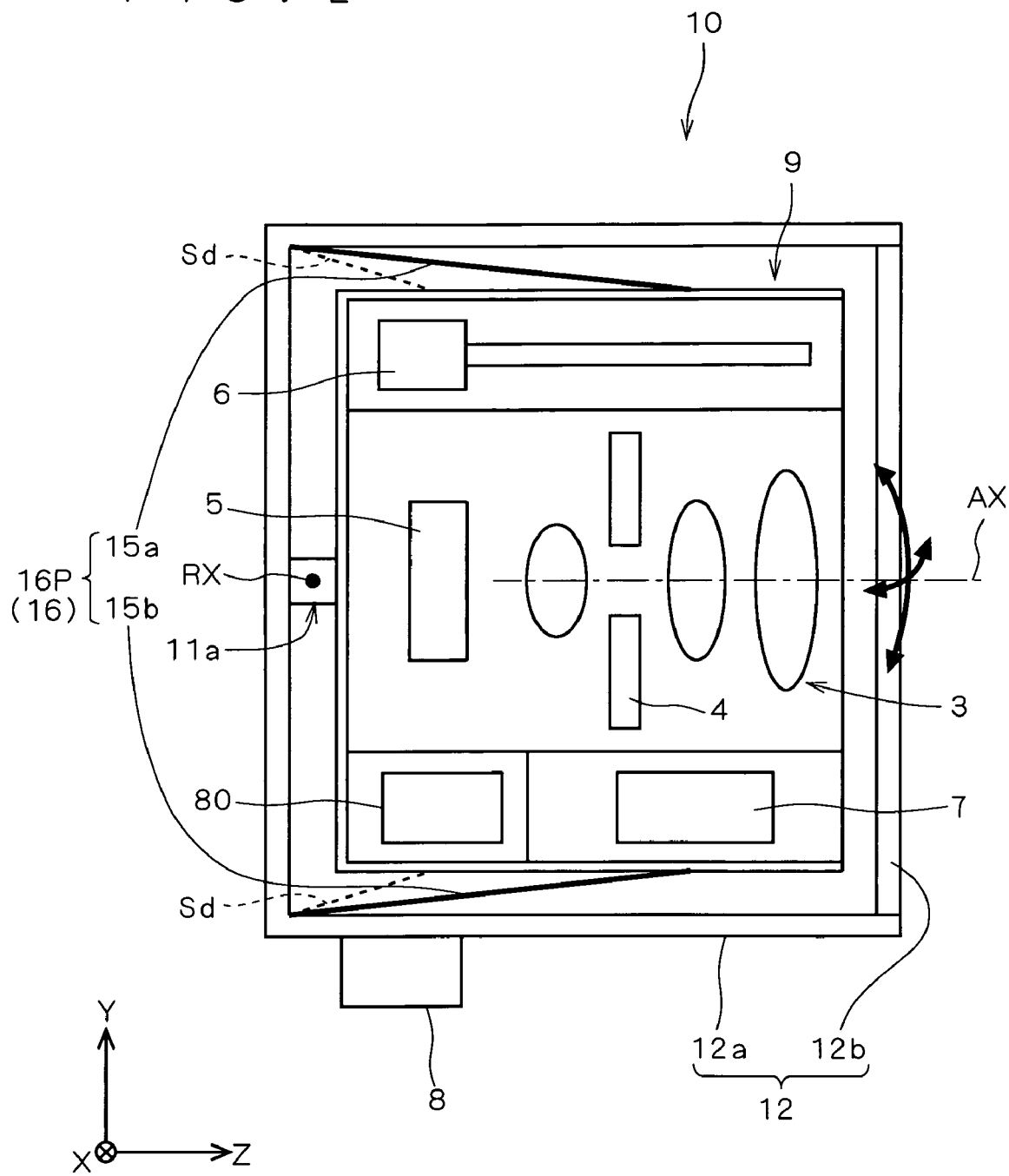
FIG. 2 is a diagram more specifically showing elements included in the auto image stabilization system of FIG. 1.

FIG. 2 is a diagram more specifically showing elements included in the auto image stabilization system 10. As shown in FIG. 2, the auto image stabilization system 10 includes an image capturing unit 9 having an almost cylindrical shape and a body-side member (also called a casing-side member) 12 having an almost cylindrical shape whose inside diameter is larger than the outside diameter of the image capturing unit 9.

The image capturing unit 9 has a taking lens 3, a diaphragm 4, an image pickup device 5, a focus actuator 6, a diaphragm actuator 7, and a position sensor 80. All of the taking lens 3, diaphragm 4, image pickup device 5, focus actuator 6, diaphragm actuator 7, and position sensor 80 are fixed to the image capturing unit 9. The taking lens 3 is constructed by one or more lenses. An optical image (subject image) of the subject obtained through the taking lens 3 is formed on the image pickup device 5. The image pickup device 5 has a group of fine pixels to each of which a color filter is attached, and photoelectric-converts the image to image signals having, for example, color components of R, G, and B. As the image pickup device 5, for example, a CCD, a CMOS, or the like is used. The focus actuator 6 can achieve a focus on the subject by moving the focus lens in the taking lens 3. The diaphragm actuator 7 can adjust the aperture of the diaphragm 4 by driving the blades of the diaphragm 4. The position sensor 80 is fixed to the image capturing unit 9 and obtains position information (a measurement value on driving) of the image capturing unit 9.

The body-side member 12 includes a member 12a having an almost cylindrical shape and whose one end face is open and a cover glass 12b provided so as to close the open face in the member 12a. The body-side member 12 is a member fixed to the body side of the cellular phone 1. Specifically, the member 12a is fixed to the body of the cellular phone 1. The cover glass 12b having translucency has the role of preventing entry of a foreign object from the outside to the image capturing unit 9 and the role of transmitting an optical image of the subject and guiding the optical image to the image pickup device 5 via the taking lens 3.

The auto image stabilization system 10 has a shake detector 8 fixed to the outer wall of the member 12a. The shake detector 8 detects a shake of the cellular phone 1.

The auto image stabilization system 10 further includes an elastic supporting member 11a having an almost columnar shape. The elastic supporting member 11a is provided between the image capturing unit 9 and the body-side member 12. One of end faces of the elastic supporting member 11a is fixed to the image capturing unit 9, and the other end face is fixed to the body-side member 12. In such a manner, the image capturing unit 9 is basically fixed to the body-side member 12 by the elastic supporting member 11a.

Since the image capturing unit 9 is supported by the elastic supporting member 11a having elasticity, in the case where a driving force of a driving unit 16 to be described later is applied, the image capturing unit 9 can rotate two-dimensionally using the elastic supporting member 11a as a fulcrum, concretely, can move around the X axis (in the pitch direction) and around the Y axis (in the yaw direction). That is, when a force larger than the holding force of the elastic supporting member 11a is applied, the image capturing unit 9 can swing around predetermined rotation axes (the axis parallel with the X axis, and the axis parallel with the Y axis) with respect to the body-side member 12.

Therefore, also in the case where the body of the cellular phone 1 swings due to a camerashake or the like, by moving the image capturing unit 9 in the direction of cancelling off the swing detected by the shake sensor 8 (in other words, in the direction opposite to the detected swing), the shake can be corrected.

As described above, the image capturing unit 9 is fixed to the body-side member 12 when it is not driven by the driving unit 16 (which will be described later), and moves relative to the body-side member 12 when the driving force of the driving unit 16 is given. In short, the image capturing unit 9 is supported (held) with appropriate strength.

In FIGS. 1 and 2, the XYZ orthogonal coordinate system is set. The X axis indicates the horizontal direction, the Y axis indicates the vertical direction, and the Z axis shows the direction orthogonal to both the X axis and the Y axis. Description will be given below by properly referring to the XYZ coordinate system.

The Details of Driving System of Auto Image Stabilization System 10

As shown in FIG. 2, the auto image stabilization system 10 has the driving unit 16 for driving the image capturing unit 9. Specifically, the auto image stabilization system 10 has a P drive actuator 16P for driving the image capturing unit 9 in the direction of rotation around the X axis (pitch direction) and a Y drive actuator 16Y (refer to FIG. 6) for driving the image capturing unit 9 in the direction of rotation around the Y axis (yaw direction). In other words, the P drive actuator 16P can rotate the image capturing unit 9 in the pitch direction, and the Y drive actuator 16Y can rotate the image capturing unit 9 in the yaw direction. By turning the image capturing unit 9 in the pitch and yaw directions using the P and Y drive actuators 16P and 16Y, a shake of the image capturing unit 9, that is, a camerashake can be corrected. As a camerashake, for example, a shake of sine wave of about 1 to 10 Hz can be corrected.

Figure 3:
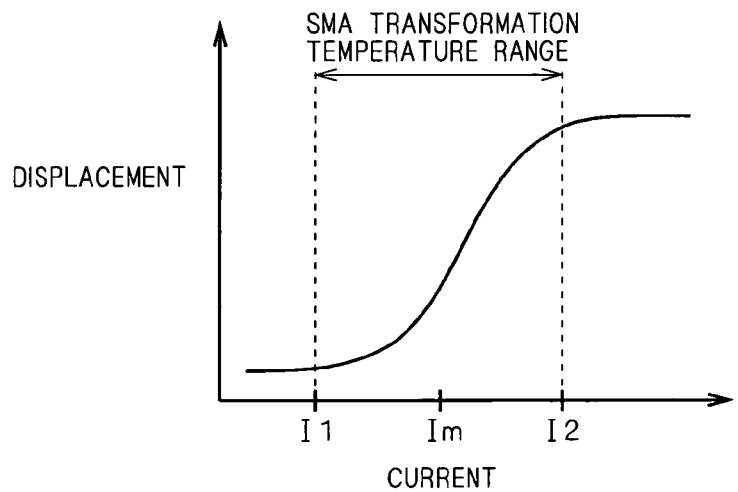
FIG. 3 is a diagram showing a current-displacement characteristic of an SMA.

The P drive actuator 16P has a pair of driving members 15 (15a and 15b). The driving members 15a and 15b are formed as wires of shape memory alloy (SMA) each having a circular section, and have a current-displacement characteristic of the SMA, for example, as shown in FIG. 3. When passed current reaches a current value I1, the SMA of the driving members 15 is heated to an austenite transformation start temperature and starts deforming in the contracting direction. When the passed current reaches a current value I2 at which the SMA is heated to the transformation end temperature, the SMA regains the stored shape and the deformation is completed. To assure excellent heat dissipation response (which will be described later) by increasing the transformation end temperature, an SMA containing titanium (Ti), nickel (Ni), and copper (Cu) may be used.

One end of each of the driving members 15a and 15b in the P drive actuator 16P is fixed to an upper part of the peripheral surface of the image capturing unit 9, and the other end is fixed to the inner face of an upper part of the body-side member 12. As will be described later, the driving members 15a and 15b expand/contract in accordance with a heat generation amount by application of current, and drive the image capturing unit 9 in the pitch direction.

As described above, the driving members 15a and 15b fixed to both of the body-side member 12 and the image capturing unit 9 are provided at both ends of the image capturing unit 9 in the pitch direction. That is, the image capturing unit 9 can be driven by the pair of driving members (hereinbelow, also called "SMA actuators") 15a and 15b connected in push-pull arrangement to the image capturing unit (movable part) 9.

The Y drive actuator 16Y has a configuration similar to that of the P drive actuator 16P. Although not shown in FIG. 2, to enable the image capturing unit 9 to be driven in the yaw direction, the Y drive actuator 16Y has a pair of driving members 15c and 15d (not shown). The driving members 15c and 15d have a configuration similar to that of the driving members 15a and 15b.

Specifically, one end of the driving member 15c is fixed to the left side of the peripheral surface (on this side in the drawing) of the image capturing unit 9, and the other end is fixed to the inner surface of the left side of the body-side member 12. One end of the driving member 15d is fixed to the right side in the peripheral surface (the back side in the drawing) of the image capturing unit 9, and the other end is fixed to the inner face of the right side of the body-side member 12. The driving members 15c and 15d expand/contract in accordance with an amount of heat generated by application of current, thereby driving the image capturing unit 9 in the yaw direction.

The drive principle of the P drive actuator 16P will be described below. The drive principle of the Y drive actuator 16Y is similar to that of the P drive actuator 16P, so that it will not be described to avoid repetitive description.

Figure 4:
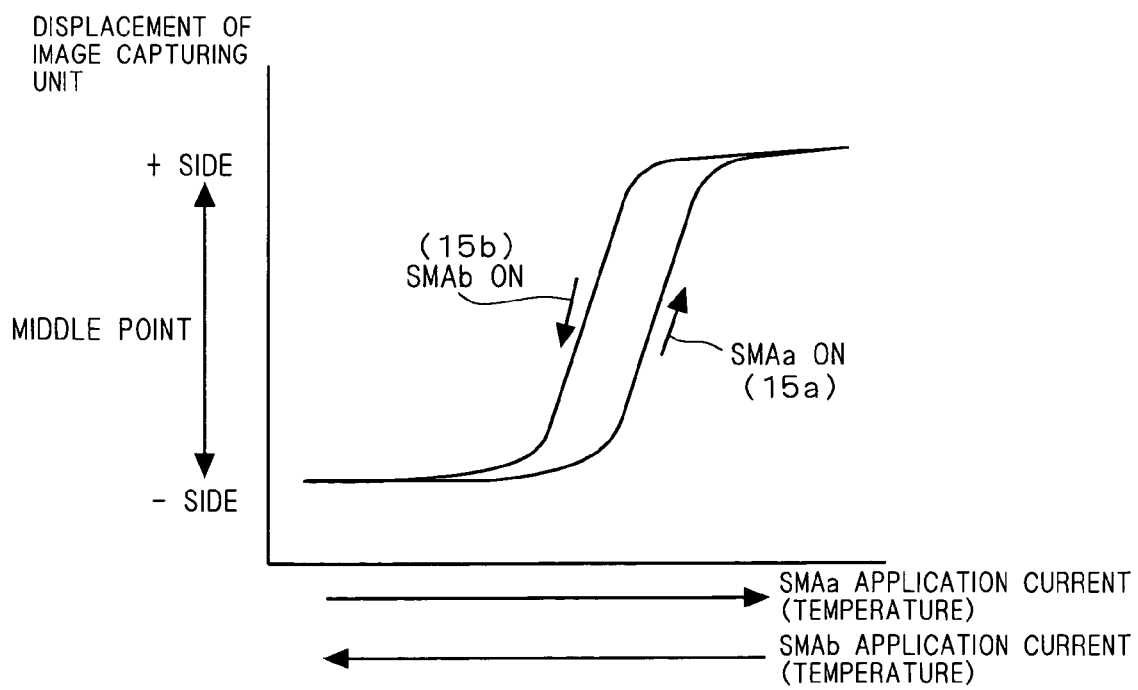
FIG. 4 is a diagram showing the relation between current applied to the SMA and a displacement in an image capturing unit.

FIG. 4 is a diagram showing the relation between current applied to the SMA and displacement of the image capturing unit 9. In the following description, FIG. 5 will be also referred to.

It is assumed that a relatively large current (for example, the upper limit value of the application current) is applied to the SMA (hereinbelow, also called "SMAb") of the drive member 15b, and no current is applied to SMA (hereinbelow, also called "SMAa") of the other drive member 15a. In this case, the driving member 15b is heated and contracted. The temperature of the driving member 15a becomes relatively low and the driving member 15a becomes vulnerable to expansion. Therefore, the driving member 15a is expanded by the contracting force of the driving member 15b (FIG. 5A).

In this state, the current applied to the SMA in the driving member 15b is decreased, and the current to the SMA in the driving member 15a is increased. As a result, the driving member 15b becomes vulnerable to expansion and the contracting force of the driving member 15a increases, so that the image capturing unit 9 gradually turns counterclockwise around the predetermined rotation axis (for example, axis RX parallel with the X axis) as a center with respect to the body-side member 12. At the time point the powers of the SMAa and SMAb become equal to each other (currents are almost the same), the lengths of the driving members 15a and 15b become the same. As shown in FIG. 5B, the image capturing unit 9 is moved to the reference position (center position) of the driving of the image capturing unit 9 in which the optical axis AX of the taking lens 3 becomes parallel with the Z axis. When the current applied to the SMA of the driving member 15a is further increased and the current applied to the SMA of the driving member 15b is further decreased, the driving member 15a further contracts and the driving member 15b further expands. Consequently, as shown in FIG. 5C, the incidence surface side of the image capturing unit 9 tilts toward upper right.

Figure 5A:
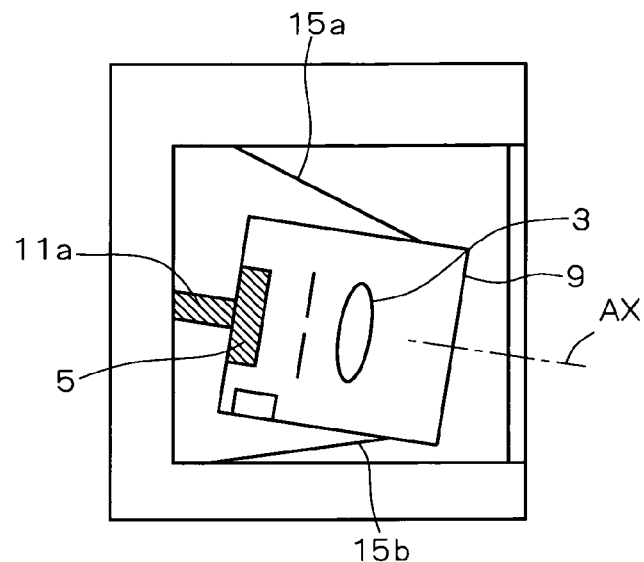
FIGS. 5A to 5C are diagrams showing the relation between the current applied to the SMA and a displacement in the image capturing unit.
Figure 5B:
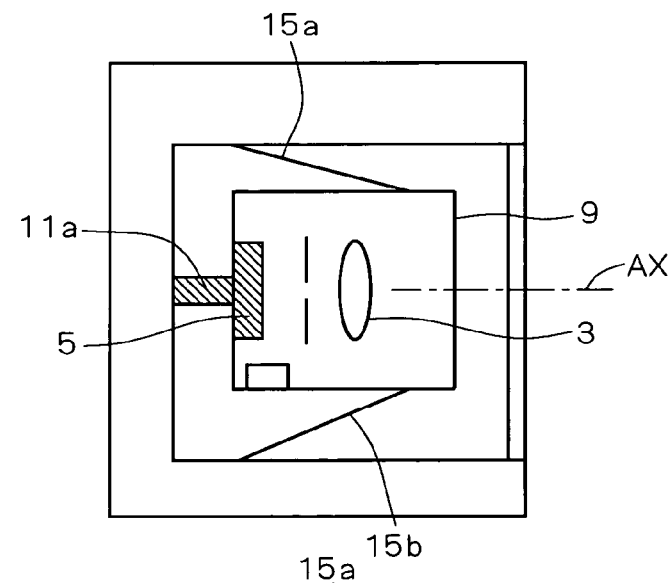
Figure 5C:
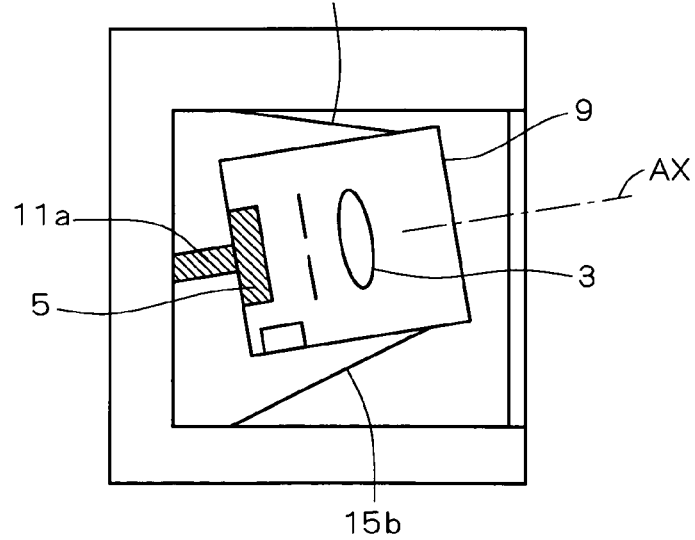

On the contrary, when the current applied to the SMA of the driving member 15b is gradually increased while gradually decreasing the current applied to the SMA of the driving member 15a in the state of FIG. 5C, the image capturing unit 9 gradually turns clockwise with respect to the body-side member 12 and changes to the state of FIG. 5B and then to the state of FIG. 5A.

By controlling the magnitudes of the currents applied to the pair of driving members 15a and 15b formed by the expandable SMAs, the image capturing unit 9 can be driven in both of the positive and negative directions of the pitch direction.

Also in the case using such a driving system, in a manner similar to the above, by driving the image capturing unit 9 in the direction of cancelling out the shake detected by the shake sensor 8 provided for the image capturing unit 9 to move the image capturing unit 9 in relation to the body-side member 12, a camerashake of the image capturing unit 9 can be corrected.

To widen the drivable range for image stabilization, it is preferable to apply a predetermined current at the time of image capture so that the image capturing unit 9 exists in the center position (refer to FIG. 5B).

As shown in FIG. 4, in the case where hysteresis exists in the displacing operation of the image capturing unit 9 by the pair of SMAs, it is sufficient to determine an input voltage or the like to compensate such hysteresis in the control system.

Figure 6:
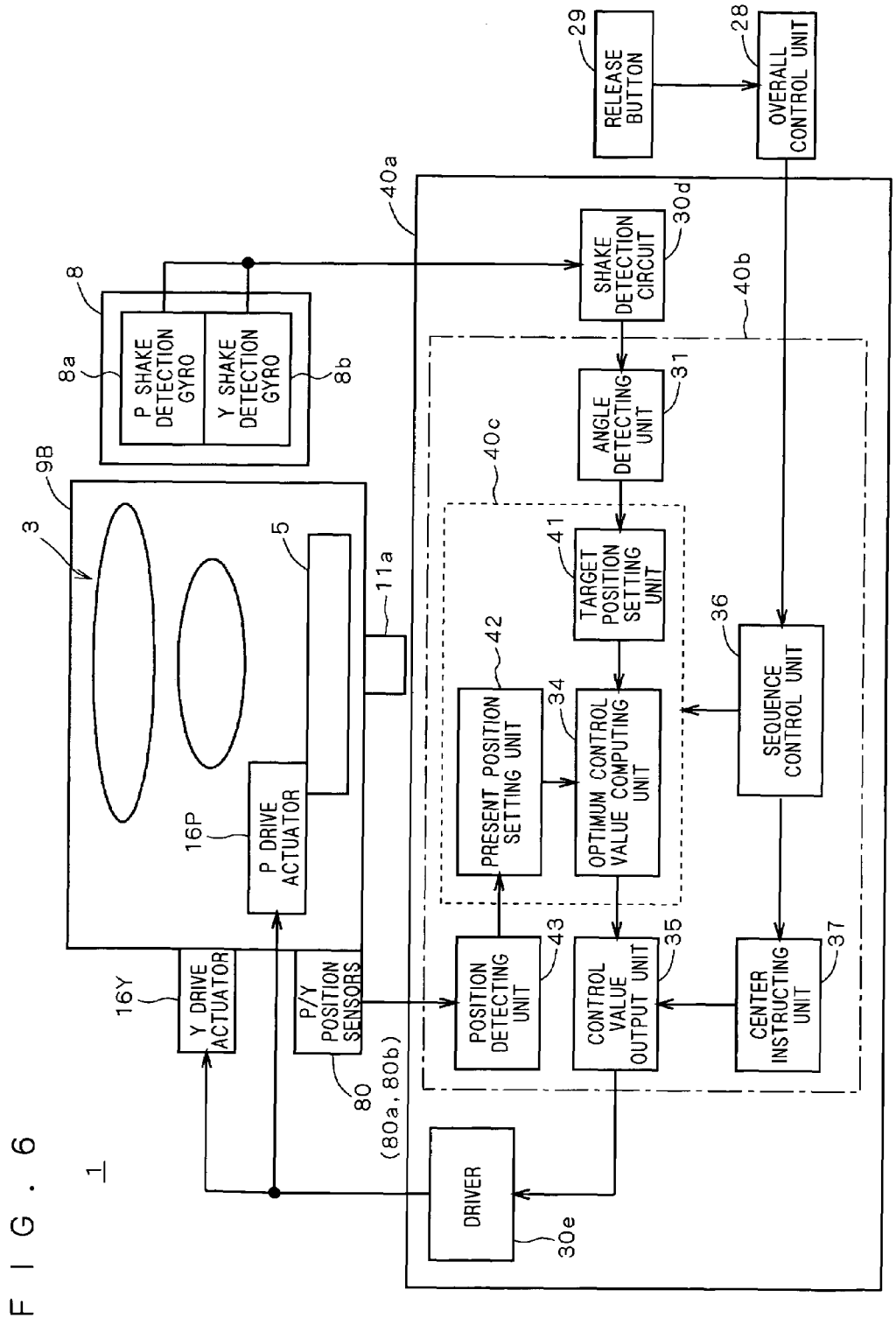
FIG. 6 is a diagram showing an outline of a control system related to an image capturing process and auto image stabilization in the cellular phone.

FIG. 6 is a diagram showing an outline of a control system on the image capturing process and auto image stabilization in the cellular phone 1. As shown in FIG. 6, the shake sensor 8 provided for the image capturing unit 9 supported by the elastic supporting member 11a detects a shake in the image capturing unit 9. Concretely, the shake detector 8 has a gyro sensor (P shake detection gyro) 8a for detecting an angular speed of the image capturing unit 9 in the pitch direction (specifically, inertial angular velocity (angular velocity to ground)) and a gyro sensor (Y shake detection gyro) 8b for detecting an angular speed of the image capturing unit 9 in the yaw direction.

Output signals from the gyros 8a and 8b of the shake sensor 8 are input to a control unit 40a, amplified by a shake detection circuit 30d, and subjected to filtering process. The resultant signal is detected as a signal indicative of "shake" in the image capturing unit 9, and input to the digital control unit 40b.

The digital control unit 40b is constructed by a microcomputer and controls the driving of the image capturing unit (movable unit) 9. By executing a predetermined software program in the microcomputer, the functions of processors including an angle detecting unit 31, a target position setting unit 41, a present position setting unit 42, an optimum control value computing unit 34, and a control value output unit 35 are realized. The target position setting unit 41, present position setting unit 42, and optimum control value computing unit 34 construct a servo control unit 40c.

The target position setting unit 41 converts the angle information detected by the angle detecting unit 31 into position information corresponding to the position sensor 80, and sets a target position of the image capturing unit 9.

The present position setting unit 42 sets, as the present position of the image capturing unit 9, the position information obtained by converting an output of the position sensor 80 and detected in a position detecting unit 43. The position sensor 80 has a P-position sensor 80a for detecting the position of an image capturing unit 9B in the pitch direction, and a Y-position sensor 80b for detecting the position of the image capturing unit 9B in the yaw direction. The position sensor 80 does not always have to have two one-dimensional position sensors 80a and 80b but may have one two-dimensional position sensor.

In the servo control unit 40c, the target position difference between the outputs of the target position setting unit 41 and the present position setting unit 42 is calculated. An optimum control value obtained by multiplying the target position difference with an optimum gain is computed by the optimum control value computing unit 34 and is output. With the optimum control value, the image capturing unit 9 is moved in the direction of cancelling off the shake detected by the shake sensor 8. In such a manner, the shake correction can be performed.

An overall control unit 28 is a part for controlling the components of the cellular phone 1 in a centralized manner, and controls the overall sequence of the cellular phone 1. The overall control unit 28 switches among an image capturing mode for capturing an image by using the image capturing unit 9, a call mode, and the like.

A release button 29 is constructed as a press-type button. When the release button 29 is pressed by the user, the press is detected by the overall control unit 28, and an image capturing operation/image stabilization start signal is sent from the overall control unit 28 to a sequence control unit 36.

The sequence control unit 36 controls the sequence of the image capturing operation using the image capturing unit 9, image stabilizing operation, and the like. Concretely, when the image capturing mode is set by the overall control unit 28, a live view image of a subject is displayed on a display 71 (LVON state). When the release button 29 is pressed, the sequence control unit 36 shifts to an image capture state, perform AF (Auto Focus) operation and AE (Auto Exposure) operation, and sends a control signal to the servo control unit 40c to start the image stabilizing operation. In the image stabilizing operation, the sequence is controlled in the following order.

(1) By receiving the angular velocity signal from the shake detection circuit 30d and performing predetermined integration, the angle of the image capturing unit 9 is detected by the angle detecting unit 31, and the target position of the image capturing unit 9 to be driven for the angle is set in the target position setting unit 41.

(2) The position of the image capturing unit 9 is detected by the position sensor 80, and is set as the present position in the present position setting unit 42.

The optimum control value is computed by the optimum control value computing unit 34 so that the present position becomes the target position, and the driving unit 16 is driven via the control value output unit 35. Consequently, the current is applied to the driving member (SMA wires) 15 on the basis of the deviation between the target position (drive target value) and the present position (measurement value), so that the driving of the image capturing unit 9 is properly servo-controlled.

By repeating the operations (1) to (3) until an image stabilization stop instruction is received, proper image stabilization can be performed.

A center instructing unit 37 is a part for holding the image capturing unit 9 in the center position shown in FIG. 5B, stores information of voltages applied to the driving members 15a to 15d necessary for holding the image capturing unit 9 in the center at a room temperature and, on the basis of the information, instructs a voltage to be applied to each of the driving members 15a to 15d. Since the application voltages necessary for holding the image capturing unit 9 in the center vary depending on the state of the image capturing unit 9, it is preferable to grasp and store the application voltage information for the driving members in which the variations are considered before shipment from factory or the like.

As described above, the control unit 40a generates a control instruction value for driving the image capturing unit 9 so as to cancel out a shake detected by the shake detection circuit 30d by using the servo control unit 40c and the control value output unit 35, and outputs the control instruction value to a driver 30e. The driver 30e has, for example, a linear driver of two channels (2ch) (driver that supplies an output voltage proportional to an input), and drives the driving unit 16 on the basis of the control instruction value from the digital control unit 40b. Consequently, the image capturing unit 9 is driven relative to the body-side member 12, thereby correcting a camerashake.

The cellular phone 1 is provided with, although not shown, as processors handling images of a subject captured by the image capturing unit 9 and obtained, an A/D converter, an image processor, and an image memory. Specifically, an image of analog signals obtained by the image pickup device 5 is converted to digital signals by an A/D converter and subjected to a predetermined image process by the image processor. The resultant image is temporarily stored in the image memory. The image stored in the image memory is recorded as an image to be recorded into the memory card, or displayed as a live view image on the display 71. In such a manner, image data is generated on the basis of an output signal from the image pickup device by the image processor and the like. Various processes on image generation are also performed under control of the overall control unit 28.

Operation of Auto Image Stabilization System 10

FIGS. 7A and 7B are diagrams illustrating operations of the auto image stabilization system 10. FIG. 7A shows the signal waveform in the target position, and FIG. 7B shows signal waveforms Ja and Jb of the voltages applied to the SMAa and SMAb, respectively. The axis of ordinate of FIG. 7A shows a movement amount (displacement amount) in the positive (+) direction using the middle point shown in FIG. 4 as Pi=0.

In the case where the target position signal in the sine wave shape shown in FIG. 7A is set, the control unit 40a in the auto image stabilization system 10 generates a drive control signal for applying a voltage having a waveform Ja in FIG. 7B to the SMAa, and also generates a drive control signal for applying a voltage having a waveform Jb of FIG. 7B to the SMAb. When the driver 30e continuously applies current to the SMAa and SMAb on the basis of the signal waveforms Ja and Jb, continuous displacements can be given to the image capturing unit 9. The characteristics of the signal waveforms Ja and Jb will be described below.

The signal waveforms Ja and Jb are analog signals which set, as a bias voltage Bs, a predetermined DC voltage necessary for applying a necessary current in the SMA transformation temperature range shown in FIG. 3, and are vibrated using the bias voltage Bs as a reference in accordance with the target position signal shown in FIG. 7A. The bias current value is set as a current value necessary for heating the SMA to a specific temperature in a temperature range from the SMA transformation start temperature to the transformation end temperature. For example, a current value Im as an intermediate value of the current values I1 and I2 as the upper and lower limits in the SMA transformation temperature range shown in FIG. 3 is set.

In the case where a signal waveform Ps1 for displacing the image capturing unit 9 to the positive (+) side in a time zone t1 (FIG. 7A) is input, for the SMAa requiring the expanding/contracting operation, the control unit 40*a* outputs a drive control signal obtained by adding a voltage value proportional to the signal waveform Ps1 like the signal waveform Ja1 in FIG. 7B to the bias voltage Bs to the driver 30*e*.

On the other hand, for the SMAb which does not have to contract but expands, in the case where heat dissipation speed of the SMA is equal to the heating speed, a voltage value "a" added to the bias voltage Bs in the signal waveform Ja1 is subtracted from the bias voltage Bs like the signal waveform Jb1 in FIG. 7B in the time zone t1.

By setting the bias voltage Bs and preventing the SMA to expand from being excessively cooled, also in the case of heating the SMA (the time zone t2 shown in FIG. 7A), a time lag of heating can be reduced, and response can be improved.

For the driving member 15, SMA having a proper wire diameter has to be used in consideration of restrictions of (1) driving force, (2) installablility, and (3) response. The restrictions will be described one by one.

(1) Driving Force

The driving force (maximum driving force) which can be generated by the SMA is almost proportional to the sectional area of the SMA. For example, the maximum driving force of the SMA having a wire diameter of $\phi$ 40 μm is about 0.6N (power of about 60 g) in actual measurement. To assure target image stabilization performance in the servo mechanism such as the auto image stabilization system 10, when variations among individual driving mechanisms, frictional force, posture, and the like are considered, it is the limit for the SMA having the wire diameter of $\phi$40 μm to drive the movable part of about 5 g.

On the other hand, in the auto image stabilization system 10, it is difficult to set the mass of the movable part to about 0.5 g or less. To reliably drive the movable part of 0.5 g, a wire diameter of $\phi$12.6 ($=40\times\sqrt{0.5/5}$) μm is necessary on the basis of the actual measurement value of $\phi$40 μm.

From the above, to assure a proper driving force in the image stabilization, preferably, the wire diameter of the SMA is set to about $\phi$15 μm or more.

(2) Installability

In the case of using the SMA as an actuator, both ends of the SMA (driving members 15*a* and 15*b*) have to be fixed as shown in FIG. 2. To attach the SMA with stable power, the wire diameter of $\phi$10 μm or more is necessary. When the wire diameter is less than $\phi$10 μm, the SMA is too thin, and workability is low. It is difficult to fix the SMA while giving predetermined stress.

(3) Response

In the auto image stabilization system 10, the response is improved by applying the bias voltage Bs to the SMAa and SMAb. In the SMA to be expanded different from the SMA which contracts, heat has to be dissipated.

As for heat dissipation of the SMA, the sectional area of the SMA and heat dissipation response (heat dissipation velocity) have the relation of proportion or higher. The smaller the sectional area or the diameter of the SMA is, the higher the heat dissipation is.

For example, when the SMA having the wire diameter of $\phi$ 40 μm is actually measured, the SMA has heat dissipation response of about 50 Hz at the ambient temperature of 25° C. (room temperature). When the temperature becomes a high temperature of 60° C., the heat dissipation response decreases to about 40 Hz and deteriorates by about 20%.

Therefore, when it is considered that the response has to be proportional to the sectional area of the SMA in order to assure necessary response in the auto image stabilization system 10 (for example, response of about 10 Hz at high temperature), the wire diameter of the SMA has to be set to $\phi$80 ($=40\times\sqrt{(40/10)}$) μm or less.

The response will be considered by conducting a simulation on a driving mechanism for linearly driving the movable part (hereinbelow, also called "linear driving mechanism") by the SMA actuator in the push-pull arrangement.

Figure 8:
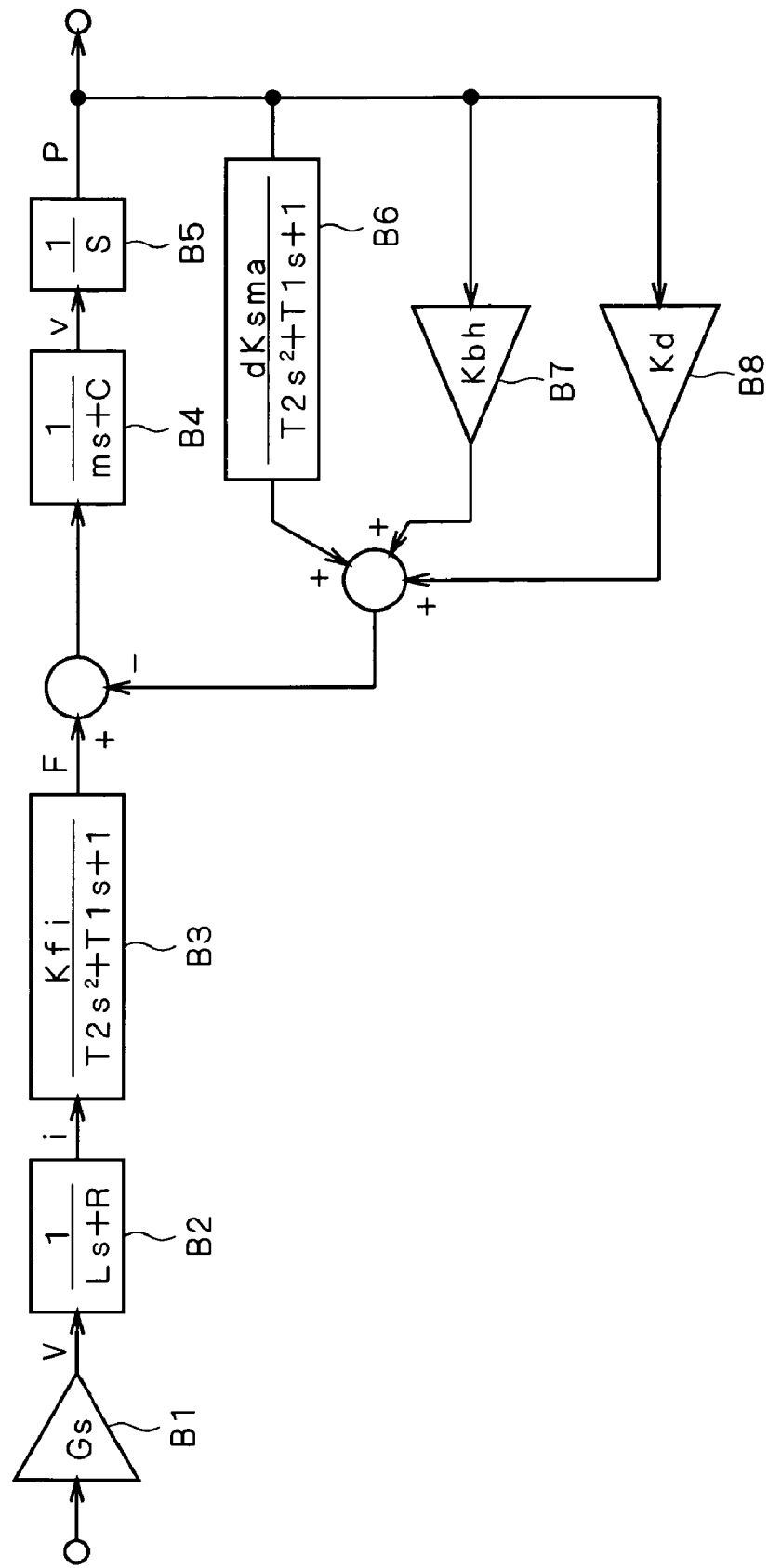
FIG. 8 is a block diagram showing a model of a driving mechanism used in simulation.
Figure 9:
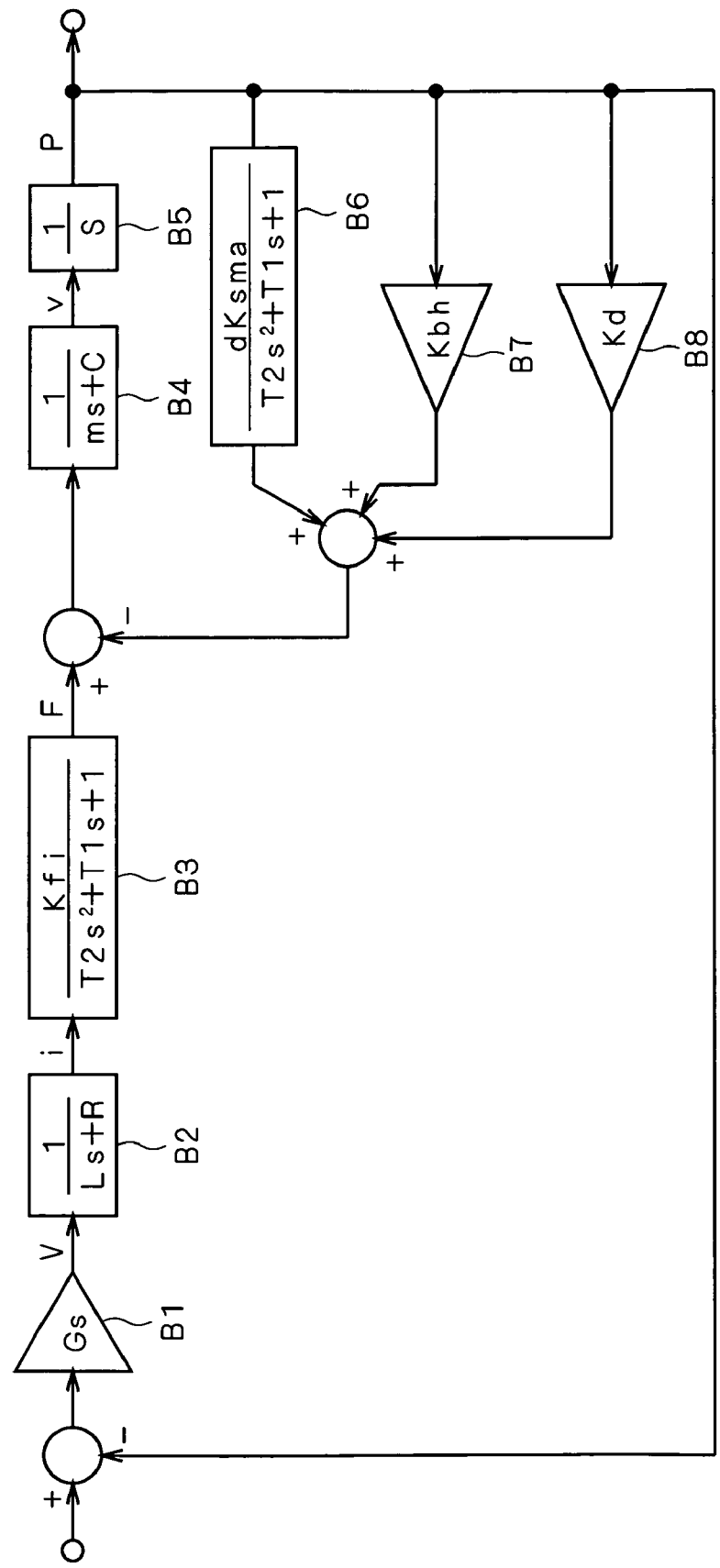
FIG. 9 is a block diagram showing a position servo model of the driving mechanism used in simulation.

FIG. 8 is a block diagram expressing a model of the driving mechanism used for the simulation. FIG. 9 is a block diagram showing a position servo model of the driving mechanism used for the simulation. In the following, the model of the driving mechanism will be briefly described.

First, when a control signal is input, the control signal is amplified by a servo amplifier B1, and a voltage V is output. Next, when the voltage V is applied to the SMA actuator, a current "i" flows on the basis of a characteristic B2 of the SMA, and a force F according to the current "i" is generated on the basis of a characteristic B3. Since the processes of current, heat generation, and generation of driving force are performed in the SMA actuator, the characteristic B3 is a system of second lag. The force F generated by the SMA acts on the movable part, thereby generating a driving speed "v" based on a driving characteristic B of the movable part. By performing an integration B5 on the driving speed "v", the position P of the movable part is obtained.

A block B6 has a coefficient dKsma indicative of the difference between a spring constant at the time of bias heating (at the time of application of the bias voltage) and a spring constant at the time of control beating in the SMA actuator. By the coefficient, the characteristic such that the spring constant of the SMA increases when the SMA actuator is heated can be reflected in the simulation.

A proportional constant Kbh of a block B7 is a spring constant of the SMA actuator at the time of bias heating, and a proportional constant Kd of a block B8 is a spring constant for a spring for dumping. The spring for dumping is provided in parallel with the SMA actuator like a blade spring (shown by a broken line) Sd in FIG. 2.

A simulation on the SMA actuator is performed on the basis of the model described above. Parameters set in the simulation will now be described.

diameter of SMA: lsma=40 [μm]

radius of SMA: rs=lsma/2 mass of the movable part: m=0.001 [kg]

radius of reference SMA: rs$\phi$=19 coefficient of viscous dynamic friction of the movable part: C=0.4 resistance between terminals of SMA: R=15×rs$\phi^2$/rs$^2$[Ω] (resistance R between the terminals is inverse proportional to the sectional area of the SMA when the length of the SMA is constant)

inductance of the SMA: L=0.7×10$^{-6}$[H]

power constant: Kfi=5.0×rs$^2$/rs$\phi^2$ (power constant Kfi is proportional to the sectional area of the SMA)

T1=1 response frequency corresponding to time constant at the time of generation of driving force in the SMA: ft2=30× 19$^3$/rs$^3$ (a model proportional to the third power of the radius is assumed in a system of second lag, and ft2 is set as 30 Hz in the SMA having the wire diameter of 40 μm)

$T2 = 1/(2\pi \times ft2)^2$ spring constant of spring for dumping: Kd=350 [N/m]

spring constant of the SMA at the time of bias heating: Kbh=300×(rs$^2$/rs$\phi^2$) [N/m]

$dKsma=300\times(rs^2/rs\phi^2)$[N/m]

gain of servo amplifier: Gs (the gain of 10 Hz in the frequency characteristic of an open loop is set to about 20 dB (ten times) even when the wire diameter of the SMA is changed)

FIGS. 10A and 10B show a simulation result of the SMA actuator having the wire diameter of φ 40 μm in which the parameters are set as described above. In the simulation result, the system remain at a system of first lag to about 10 Hz, and it is understood that the SMA actuator is suitable for the auto image stabilization.

Figure 11A:
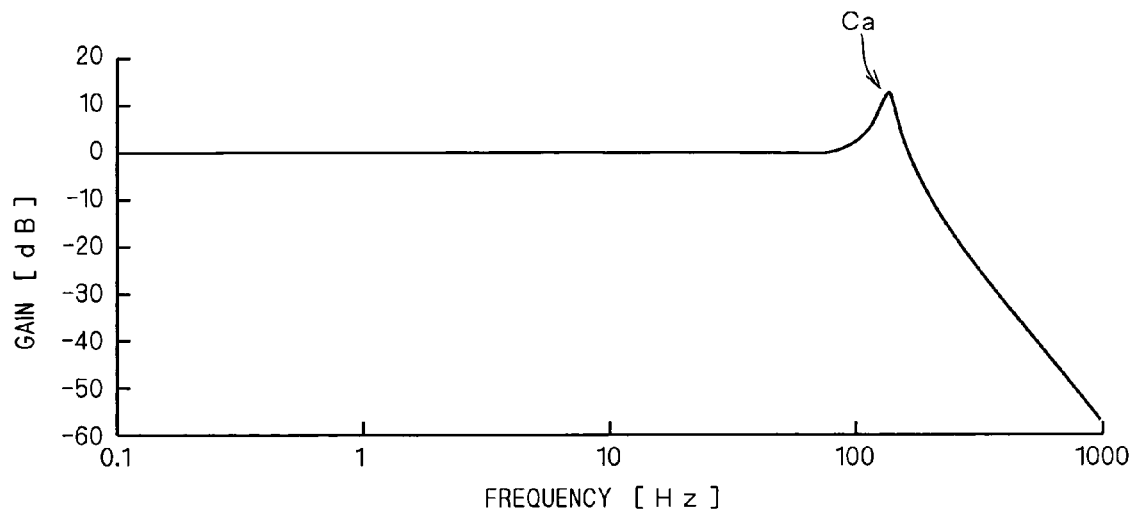
FIGS. 11A and 11B are diagrams showing a result of simulation of a position servo model performed on the SMA actuator having a wire diameter of $\phi 40$ μm.
Figure 11B:
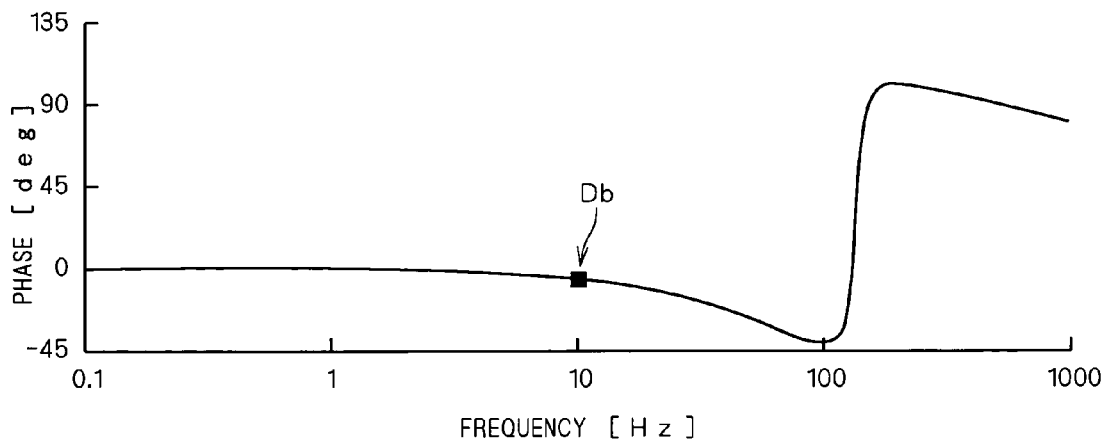

FIGS. 11A and 11B are diagrams showing a simulation result of the position servo model on the SMA actuator having the wire diameter of φ40 μm.

As shown in FIGS. 11A and 11B, by performing the position feedback (servo control) of the movable part in a driving mechanism, the frequency characteristic to 100 Hz is improved as compared with that in the open control shown in FIGS. 10A and 10B. Since the wire diameter is φ40 μm, the heat dissipation response in the SMA actuator on the heat dissipation side is excellent. A phase delay at around 10 Hz is also suppressed to about 7° (refer to point Db on the graph shown in FIG. 13B), so that target response of the image stabilization (for example, a phase delay at 10 Hz is 8° or less) is satisfied. Although mechanical resonance Ca occurs at around 120 Hz due to the relation between the mass of the movable part and the spring component, it is resonance at a frequency higher than the frequency necessary for the image stabilization. Consequently, it can be improved by a mechanical damper or the like.

In consideration of the simulation results, it is understood that preferable wire diameter of the SMA actuator is φ40 μm or less from the viewpoint of response.

As described above, in the SMA actuators in the auto image stabilization system 10, by setting the diameter of the SMA actuator in the range from 10 μm to 80 μm (in terms of sectional area, from 80 (=about $\pi 5^2$) μm² to 5030 (=about $\pi 40^2$) μm²), installability and response can be properly improved. Further, by limiting the diameter of each of the SMA actuators to 15 μm to 40 μm (in terms of sectional area, from 180 (=about $\pi 7.5^2$) μm² to 1260 (=about $\pi 20^2$) μm²), response can be further improved and a proper driving force can be assured in image stabilization.

In the control of the auto image stabilization system 10, it is not necessary to perform the analog driving control shown in FIG. 7, but any of the following two controls may be performed.

(1) Thinning-Out Control

Figure 12A:
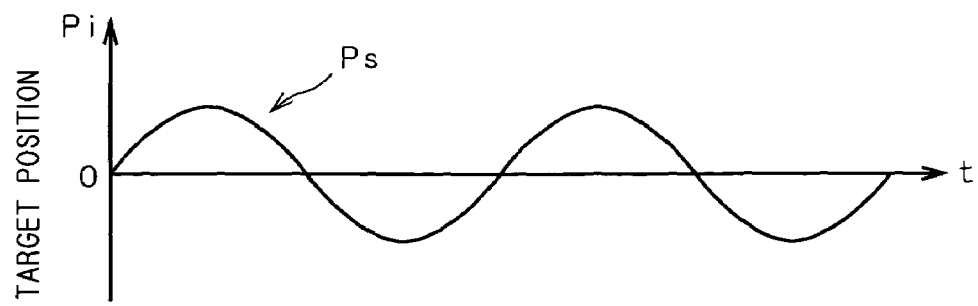
FIGS. 12A to 12D are diagrams illustrating operation of thinning-out control in the auto image stabilization system.
Figure 12B:
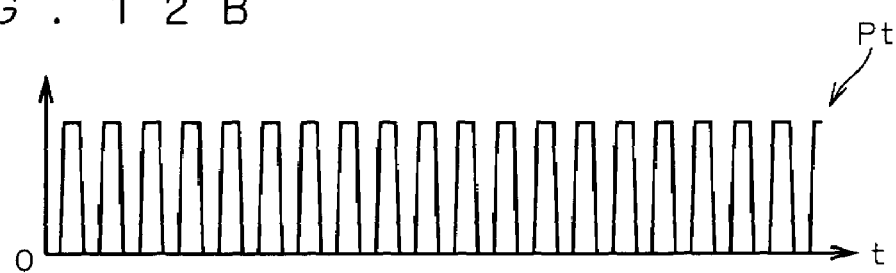
Figure 12C:
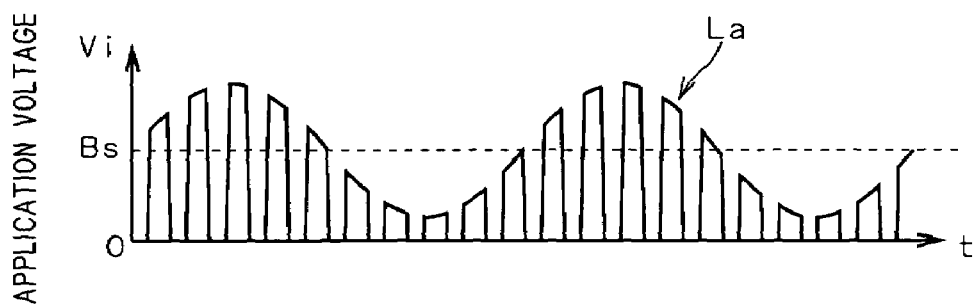
Figure 12D:
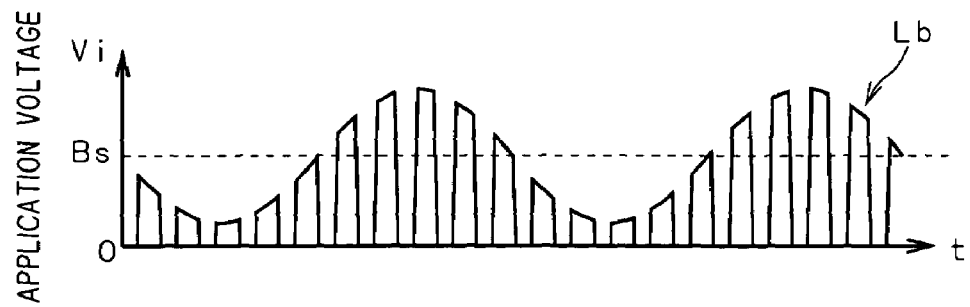

FIGS. 12A to 12D are diagrams illustrating thinning-out control in the auto image stabilization system 10. FIG. 12A shows a signal waveform in a target position. FIG. 12B shows a pulse signal Pt. FIGS. 12C and 12D show signal waveforms La and Lb of voltages applied to the SMAa and SMAb, respectively.

In the digital control unit 40b, on the basis of the target position signal Ps shown in FIG. 12A, the signal waveforms Ja and Jb for applying voltages to the SMAs as shown in FIG. 7B are generated.

By performing a process of combining the signal waveforms Ja and Jb, and the pulse signals Pt (FIG. 12B) as thinning-out signals generated in the digital control unit 40b, the drive waveform La of the SMAa shown in FIG. 12C and the drive waveform Lb of the SMAb shown in FIG. 12D are generated. The pulse signal Pt has a frequency at which the SMA does not react (respond), for example, 1 kHz or higher.

Since voltages are applied to the SMAa and SMAb on the basis of the signal waveforms La and Lb thinned-out by using the pulse signals Pt, power can be reduced according to the ratio (duty ratio) between on-time and off-time of the pulse signals Pt. When the duty ratio corresponding to the thinning-out rate becomes lower, power enough to displace the SMA to the target position cannot be supplied and the performance deteriorates. Consequently, the duty ratio is set so that an average value of current per unit time lies within the SMA transformation temperature range shown in FIG. 3.

By thinning-out the drive current signals of the SMA as described above, power in the auto image stabilization system 10 can be saved.

(2) PWM Driving Control

FIGS. 13A and 13B and FIGS. 14A and 14B are diagrams illustrating the operations of the PWM control in the auto image stabilization system 10. FIGS. 13A and 14A show signal waveforms Na1 and Na2 of voltages applied to the SMAa, respectively. FIGS. 13B and 14B show signal waveforms Nb1 and Nb2 of voltages applied to the SMAb, respectively.

In the digital control unit 40b, voltages are applied to the SMAs on the basis of the pulse signal (PWM), and the signal waveforms Na1 and Nb1 shown in FIGS. 13A and 13B are set as pulse signals corresponding to the bias voltage Bs (FIG. 7B) as a reference. The signal waves Na1 and Nb1 are generated as pulse signals in which the duty ratio is set to 50%. The pulse signals are complementary signals such that when one of the signals is on, the other signal is off. Concretely, as shown in FIGS. 13A and 13B, the on time of each of the signal waveforms Na1 and Nb1 is set to 0.5 tm which is the half of one pulse cycle tm of each of the waveform signals Na1 and Nb1. By setting the carrier frequency of the pulse signal to a sufficiently high frequency (for example, 1 kHz or higher) with respect to the response of the SMA, the carrier frequency is suppressed to the level at which the influence of a driving error caused by trace to the pulse signal itself can be ignored.

In the case of driving the image capturing unit 9 to the displacement+side (FIG. 4), the signal waveforms Na2 and Nb2 shown in FIGS. 14A and 14B are generated by the digital control unit 40b. Specifically, the signal waveform Na2 for the SMAa and the signal waveform Nb2 for the SMAb are set to the duty ratio of 80% obtained by increasing the signal waveform Na1 of the duty ratio 50% by 30%, and the duty ratio of 20% obtained by decreasing the signal waveform by 30% as shown in FIGS. 14A and 14B, respectively, and maintain the complementary relation.

By repeating the application of the voltages based on the signal waveforms Na2 and Nb2 to the SMAa and SMAb, the contracting operation of the SMAa is continuously performed and the SMAb expands. Consequently, the image capturing unit 9 is moved as shown by the target position signal Ps1 shown in FIG. 7A.

To drive the image capturing unit 9 to the displacement negative (−) side (FIG. 4), for example, it is sufficient to use the signal waveform Nb2 of FIG. 14B as the drive waveform of the SMAa and use the signal waveform Na2 of FIG. 14A as the drive waveform of the SMAb.

By performing the PWM control as described above, in a manner similar to the analog drive control, the response of displacement of the SMA can be improved.

Although the form of assembling the simple-type auto image stabilization system 10 in the cellular phone 1 has been described above, an auto image stabilization system 10A which is often assembled in the cellular phone 1 in practice will be described below.

Auto Image Stabilization System 10A

Figure 15:
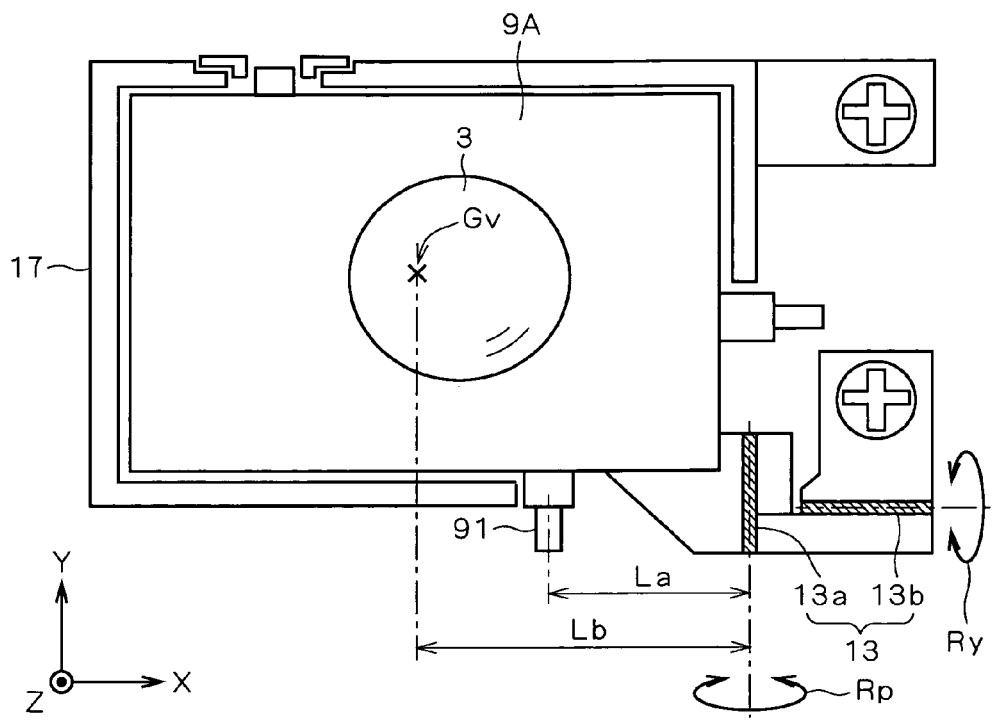
FIG. 15 is a front view showing the configuration of a main part of an auto image stabilization system according to an embodiment of the invention.
Figure 16:
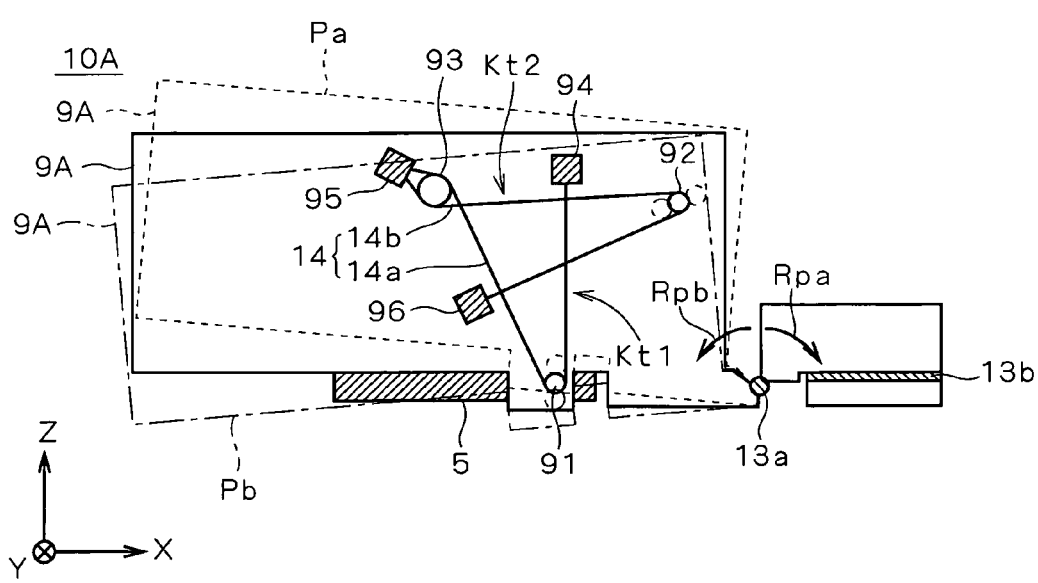
FIG. 16 is a side view showing the configuration of a main part of the auto image stabilization system.

FIG. 15 is a front view showing the configuration of a main part of the auto image stabilization system 10A according to an embodiment of the invention. FIG. 16 is a side view showing the configuration of the main part of the auto image stabilization system 10A.

The auto image stabilization system 10A is constructed as a two-dimensional swing mechanism, and includes a rectangular-parallelepiped image capturing unit (movable part) 9A having a configuration similar to that of the image capturing unit 9 shown in FIG. 2, and a body-side member 17 fixed to the body side of the cellular phone and corresponding to the body-side member 12 (FIG. 2). The image capturing unit 9A has the taking lens 3, the position sensor, and the like in a manner similar to the image capturing unit 9 but is different from the image capturing unit 9 with respect to the point that the image pickup device 5 is provided on the outside of the casing of the image capturing unit 9A. Although not shown, the shake sensor 8 (refer to FIG. 2) is attached to the outside wall of the body-side member 17.

The auto image stabilization system 10A has two elastic deforming parts 13 (13a and 13b) such as elastic hinges and a pair of driving members 14 (14a and 14b) formed as wires of the SMA. By the elastic deforming parts 13a and 13b, the image capturing unit 9a can swing in the pitch direction Rp and the yaw direction Ry.

Both ends of the driving member 14a functioning as the SMA actuator are fixed to two terminals 94 and 95 of the body-side member 17, and both ends of the driving member 14b are fixed to the terminal 95 and a terminal 96 of the body-side member 17. The driving member 14a is in contact with a columnar projection 93 provided for the body-side member 17 and is retained by a columnar projection 91 provided for the image capturing unit 9A. On the other hand, the driving member 14b is also in contact with the columnar projection 93 provided for the body-side member 17, and is retained by a columnar projection 92 provided for the image capturing unit 9A.

In the auto image stabilization system 10A having such a configuration, when current is passed to the driving member 14a via the terminals 94 and 95, the image capturing unit 9A swings in the positive (+) direction Rpa of the pitch direction around the elastic deforming part 13a as a center by the contracting/expanding operations of the driving member 14a and the driving member 14b connected in the push-pull relation with respect to swing in the pitch direction Rp of the image capturing unit 9A, and the image capturing unit 9A is moved to, for example, a position Pa. On the other hand, when current is passed to the driving member 14b via the terminals 95 and 96, the image capturing unit 9A swings in the negative (−) direction Rpb of the pitch direction around the elastic deforming part 13a as a center by the contracting operation of the driving member 14b and the expanding operation of the driving member 14a, and the image capturing unit 9A is moved to, for example, a position Pb.

The image capturing unit 9A can be also moved (swung) in the yaw direction Ry, although not shown, by a configuration similar to that in the pitch direction Py.

In such an auto image stabilization system 10A, the size of the image capturing unit 9A including the lens 3 is large to a certain degree. Consequently, a distance Lb from the rotation center of the elastic deforming part 13a to center Gv of gravity (point of application) of the image capturing unit 9A becomes longer than a distance La from the rotation center of the elastic deforming part 13a to the projection (power point) 91. To be concrete, in many cases, (Lb/La)≧about 1.5. In such cases, equivalent mass (apparent mass) of the image capturing unit 9A becomes (Lb/La) times, so that it causes deterioration in response. Deterioration in response will be described in detail below.

The frequency fc of mechanical resonance in the auto image stabilization system 10A is expressed by the following equation (1) when spring constant determined according to the sectional area or the like of the driving member 14 is expressed as Kb and the equivalent mass of the image capturing unit is expressed as "m".

$$fc=(1/2\pi)\times\sqrt{(Kb/m)} \quad \text{Equation (1)}$$

Therefore, in the case where the equivalent mass "m" of the image capturing unit becomes 1.5 times, the resonance frequency fc drops by about 20%. For example, as shown in FIGS. 17 and 18, the frequency characteristics of solid lines corresponding to FIGS. 10 and 11 degrade to frequency characteristics of virtual lines, and the resonance frequency drops from 120 Hz to around 100 Hz.

Since the response deteriorates due to increase in the equivalent mass, in the auto image stabilization system 10A, by improving the shape of the driving member 14, heat dissipation improves and, accordingly, response improves.

FIG. 19 is a diagram showing the relation between ellipticity of the driving member 14 and cooling time.

The ellipticity expresses "length of minor axis: length of major axis" of the sectional shape (ellipse shape) of the driving member 14. As the cooling time, time (measurement result) required to cool the driving member 14 having the same sectional area from 70° C. to about 40° C. is expressed as a reference (100%) in case 1.

The more the ellipticity increases, the more the cooling time is shortened. It is because the heat dissipation improves due to shortening of the distance from the surface in the shorter direction to the center (of gravity) of the driving member 14 and increase in the surface area of the driving member 14.

In FIG. 19, the cooling time in case 3 in which the section has an ellipse shape and the ellipticity is 1:1.35 is shorter than that in case 1 by about 20%. Since the sectional areas of the driving member 14 in the cases 1 and 3 are the same, driving forces generated by current application and the spring constant Kb in Equation (1) are also the same.

Therefore, improvement in response proportional to shortening of the cooling time can be expected. To maintain the driving performance by recovering the resonance frequency fc lowered by about 20% in the SMA having a circular section in the case where the equivalent mass of the image capturing unit becomes 1.5 times, it is sufficient to increase the ratio of the length of the major axis to the length of the minor axis in the ellipse section of the driving member 14 by 1.3 times or more.

That is, by employing the driving member (SMA actuator) 14 in which a value obtained by dividing the width in the longer direction of the wire section by the width in the shorter direction is 1.3 or larger in the auto image stabilization system 10A, the response of the SMA actuator can be properly improved. In consideration of the installability and response, the sectional area of the SMA actuator is, preferably, in the range of 80 μm² to 5,030 μm² and, more preferably, in the range of 180 μm² to 1,260 μm².

The driving member (SMA actuator) 14 does not have to be constructed as a wire having an ellipse-shaped section but may be constructed as a wire having a rectangular-shaped section. Also in the case of using such a band-shaped wire, by setting a value obtained by dividing the width in the longer direction of the wire section by the width in the shorter direction to be 1.3 or larger, heat dissipation of the SMA is increased, and the response can be properly improved.

With respect to deterioration in response due to increase in the equivalent mass of the image capturing unit 9A, the response may be improved by using two or more driving members 14 having a circular section.

Figure 20A:
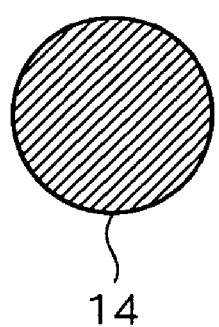
FIGS. 20A and 20B are diagrams illustrating the case where two driving members are stretched in parallel to each other.
Figure 20B:
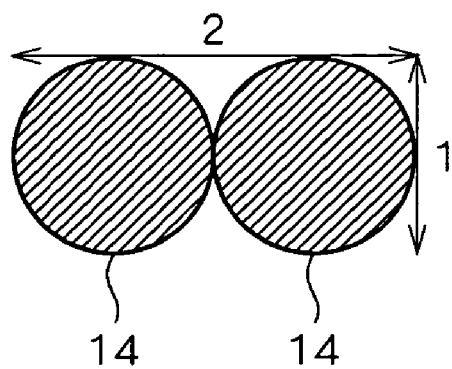

Specifically, two driving members 14 each having a circular section as shown in FIG. 20A are stretched in parallel as shown in FIG. 20B. Concretely, two SMA wires are stretched so as to be adjacent to each other along a stretch route (the same stretch route) Kt1 of the driving member 14*a* shown in FIG. 16 and two SMA wires are stretched so as to be adjacent to each other along a stretch route Kt2 of the driving member 14*b*. Since the driving forces generated in the adjacent SMAs have to be made equal to each other, it is requested to attach the SMAs having the same length to the terminals 94 and 95 and the like with high precision.

By stretching the two driving members 14 having the same wire diameter in parallel with each other, the total sectional area is doubled (refer to FIG. 20B), and the driving force by current application can be doubled (the spring constant Kb in the equation (1) can be also doubled). Consequently, also in the case where the equivalent mass of the image capturing unit becomes 1.5 times or more, the response can be recovered by doubling the driving force. Even when the two driving members 14 are used, the heat dissipation is equivalent to that in the case of using one driving member 14, so that response in heat dissipation does not deteriorate.

It is not essential to stretch two driving members 14 in parallel with each other but three or more driving members 14 may be stretched. In this case as well, increase in the driving force according to the number of the driving members 14 can be expected, so that response improves.

Modifications

In the configuration of the auto image stabilization system 10A in the foregoing embodiment, it is not essential to provide two SMAs (driving members 14*a* and 14*b*) in the push-pull arrangement for the movable part (image capturing unit 9A). Alternatively, one elastic member such as a coil spring that can expand and gives energizing force, for example, in the contraction direction and one SMA may be provided in the push-pull arrangement.

While the invention has been shown and described in detail, the foregoing description is in all aspects illustrative and not restrictive. It is therefore understood that numerous modifications and variations can be devised without departing from the scope of the invention.

What is claimed is:

1. A driving apparatus comprising:
   (a) a movable part; and
   (b) an actuator connected to said movable part and driving said movable part, said actuator having a first elastic part and a second elastic part which are connected to said movable part in a push-pull relation,
   at least one of said first elastic part and said second elastic part being formed as a wire made of a shape memory alloy, and
   a sectional shape of said wire being the same in size and an ellipse shape along a length thereof.

2. The driving apparatus according to claim 1, wherein length d1 in a longer direction and length d2 in a shorter direction with regard to said sectional shape of said wire satisfy the following equation;

$$d1/d2 \geq 1.3.$$

3. The driving apparatus according to claim 1, wherein sectional area S of said wire satisfies the following equation;

$$80\ \mu m^2 \leq S \leq 5{,}030\ \mu m^2.$$

4. The driving apparatus according to claim 1, further comprising:
   (c) a sensor for obtaining a measurement value with regard to a driving of said movable part; and
   (d) a controller for passing current to said wire on basis of a deviation between a drive target value of said movable part and said measurement value in order to control a driving of said movable part.

5. The driving apparatus according to claim 1, wherein said actuator includes a third elastic part and a fourth elastic part which are connected to said movable part in a push-pull relation and at least one of said third elastic part and said fourth elastic part are formed as a wire made of a shape memory alloy, and
   wherein a sectional shape of said wire comprising said third elastic part or said fourth elastic part is substantially the same in size and an ellipse shape along an entire length thereof.

6. The driving apparatus according to claim 5, further comprising a pair of hinges mounted to said movable member and configured so that in the case where said movable member is mounted to a body member via said hinges, said movable member is pivotable in both pitch and yaw directions as a result of a displacement caused by said actuator.

7. The driving apparatus according to claim 1, further comprising a flexible mounting member attached to said a movable part and configured so that in the case where said movable member is mounted to a body member via said flexible mounting member, said movable part is pivotable about said flexible mounting member during a displacement of said movable member by said actuator.

8. The driving apparatus according to claim 4, wherein said controller is configured to pass a current to said wire by applying a voltage to said wire, an amount of said applied voltage being is based on both a bias amount of voltage, which is sufficient to provide current to achieve a shape memory transformation temperature, and a variable amount of voltage, which is based on an amount of deviation between a drive target value of said movable part and said measurement value.

9. The driving apparatus according to claim 8, wherein said controller is further configured to control a duty cycle of a current passed to said wire, a value of said duty cycle being set so that an average value of current per unit time is within the current necessary to achieve a shape memory transformation temperature.

10. The driving apparatus according to claim 4, wherein said controller is configured to pass a current to said wire by applying a pulse width modulated voltage to said wire, a pulse width of said applied voltage being based on amount of deviation between a drive target value of said movable part and said measurement value.

11. The driving apparatus according to claim 1, wherein said controller is configured to pass a predetermined current to said wire to establish a center position for said movable member.

12. A driving apparatus comprising:
   a body member;
   a movable part;
   a flexible member attached between said body member and said movable part flexibly linking said body member to said movable part while permitting flexible motion therebetween; and an actuator connected between said body member and said movable part and configured to drive said movable part in motion with respect to said body member;

wherein said actuator includes at least two shape memory alloy members formed in the shape of a wire, each shape memory alloy member between disposed between said body member and said movable part so as to be configured to induce motion between said body member to said movable part based on a shape change of said shape memory alloy member, each shape memory allow member between connected to said movable part in a push-pull relation with a corresponding elastic part, a configuration of said wire of each of said shape memory alloy members being configured to enhance heat dissipation from said wire, said shape memory alloy members being configured with respect to said body member and said movable part so as to be configured to induce both pitch and yaw motion between said body member and said movable part based on a shape change of said shape memory alloy members.

13. The driving apparatus according to claim 12, further comprising:

a sensor for obtaining a measurement value with regard to a driving of said movable part; and a controller for passing current to said shape memory alloy members on basis of a deviation between a drive target value of said movable part and said measurement value in order to control a driving of said movable part.

14. The driving apparatus according to claim 13, wherein said controller is configured to pass a current to said shape memory alloy members by applying a voltage to said shape memory alloy members, an amount of said applied voltage being is based on both a bias amount of voltage, which is sufficient to provide current to achieve a shape memory transformation temperature, and a variable amount of voltage, which is based on an amount of deviation between a drive target value of said movable part and said measurement value.

15. The driving apparatus according to claim 14, wherein said controller is configured to pass a predetermined current to each of said shape memory alloy members to establish a center position for said movable member in both pitch and yaw directions.

16. The driving apparatus according to claim 15, wherein a sectional shape of said wire of each of said shape memory alloy members is an ellipse shape along an entire length thereof and having substantially the same size along an entire length thereof.

17. The driving apparatus according to claim 16, wherein said elliptical sectional shape of said wire has a ratio of a major axis of said ellipse to a minor axis of said ellipse equal to or greater than 1.3.

18. The driving apparatus according to claim 17, wherein sectional area S of said wire satisfies the following equation;

$$80\ \mu m^2 \leq S \leq 5{,}030\ \mu m^2.$$

19. A driving apparatus for a cellular telephone auto image stabilization system, comprising:

a body side member which is configured to be mounted to the structure of a cellular telephone;

a substantially columnar shaped flexible supporting member attached to said body side member;

a movable member mounted to said flexible supporting member so that said movable member is substantially mounted inside a portion of said body side member, said flexible supporting member linking said body side member to said movable member while permitting flexible motion therebetween, said movable member being adapted to support an image capturing unit so that said image capturing unit can move with said movable member relative to said body side member;

a shake detector for detecting a shaking motion;

a sensor for obtaining a measurement value with regard to a position of said movable member relative to said body side member;

an actuator connected between said body member and said movable member and configured to drive said movable member in motion with respect to said body member, wherein said actuator includes at least two shape memory alloy members formed in the shape of a wire, each shape memory alloy member between disposed between said body side member and said movable part so as to be configured to induce motion between said body side member to said movable part based on a shape change of said shape memory alloy member, each shape memory allow member between connected to said movable part in a push-pull relation with a corresponding elastic part, a sectional shape of said wire of each of said shape memory alloy members being an ellipse shape along an entire length thereof and having substantially the same size along an entire length thereof, said shape memory alloy members being configured with respect to said body member and said movable part so as to be configured to induce both pitch and yaw motion between said body member and said movable part based on a shape change of said shape memory alloy members; and a controller for passing current to said shape memory alloy members on basis of an output from said shake detector and a deviation between a drive target value of said movable member based on a measurement value from said sensor and in order to control a driving of said movable member.

20. The driving apparatus according to claim 19, wherein a length d1 in a longer direction and a length d2 in a shorter direction with regard to said elliptical sectional shape of said shape memory alloy members satisfies the following equation:

$$d1/d2 \geq 1.3;\ \text{and}$$

wherein a sectional area S of said shape memory alloy members satisfies the following equation;

$$180\ \mu m^2 \leq S \leq 1{,}260\ \mu m^2.$$

* * * * *

UNITED STATES PATENT AND TRADEMARK OFFICE
CERTIFICATE OF CORRECTION

| | | |
|---|---|---|
| PATENT NO. | : 7,640,741 B2 | Page 1 of 1 |
| APPLICATION NO. | : 11/598358 | |
| DATED | : January 5, 2010 | |
| INVENTOR(S) | : Yoshihiro Hara | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,640,741 B2  
APPLICATION NO. : 11/598358  
DATED : January 5, 2010  
INVENTOR(S) : Yoshihiro Hara Page 1 of 1

It is certified that error appears in the above-identified patent and that said Letters Patent is hereby corrected as shown below:

Column 16:
Lines 24, 25, and 27 claim 6, delete "member" and insert -- part --.

Column 16:
Lines 30-31 claim 7, delete "said a moving" and insert -- said moving --.

Column 16:
Lines 32 and 35 claim 7, delete "moveable member" and insert -- moveable part --.

Column 16:
Line 60 claim 11, delete "member" and insert -- part --.

Column 17:
Line 33 claim 14, delete "being is based" and insert -- being based --.

Column 17:
Line 41 claim 15, delete "member" and insert -- part --.

Signed and Sealed this  
Twenty-second Day of February, 2011

David J. Kappos  
*Director of the United States Patent and Trademark Office*